(12) United States Patent
Tazume

(10) Patent No.: US 11,970,267 B2
(45) Date of Patent: Apr. 30, 2024

(54) CONTROL DEVICE, SYSTEM, AND METHOD

(71) Applicant: Rakuten Group, Inc., Tokyo (JP)

(72) Inventor: Toshiaki Tazume, Tokyo (JP)

(73) Assignee: Rakuten Group, Inc., Tokyo (JP)

( * ) Notice: Subject to any disclaimer, the term of this patent is extended or adjusted under 35 U.S.C. 154(b) by 509 days.

(21) Appl. No.: 17/257,724

(22) PCT Filed: Aug. 30, 2019

(86) PCT No.: PCT/JP2019/034225
§ 371 (c)(1),
(2) Date: Jan. 4, 2021

(87) PCT Pub. No.: WO2021/038854
PCT Pub. Date: Mar. 4, 2021

(65) Prior Publication Data
US 2022/0324563 A1    Oct. 13, 2022

(51) Int. Cl.
*B64C 39/02* (2023.01)
*G05D 1/00* (2006.01)
*G08G 5/02* (2006.01)
*B64U 101/60* (2023.01)

(52) U.S. Cl.
CPC ......... *B64C 39/024* (2013.01); *G05D 1/0212* (2013.01); *G05D 1/101* (2013.01); *G08G 5/02* (2013.01); *B64U 2101/60* (2023.01); *G05D 2201/0207* (2013.01)

(58) Field of Classification Search
CPC .... B64C 39/024; G05D 1/0212; G05D 1/101; G05D 2201/0207; G08G 5/02; B64U 2101/60
See application file for complete search history.

(56) References Cited

U.S. PATENT DOCUMENTS

| | | | |
|---|---|---|---|
| 10,553,122 B1* | 2/2020 | Gilboa-Amir | G08G 5/0013 |
| 11,392,130 B1* | 7/2022 | Desrosiers | G01C 21/20 |
| 11,402,837 B1* | 8/2022 | Siegel | G01C 21/3415 |
| 2010/0193626 A1* | 8/2010 | Goossen | B64C 37/00 244/2 |
| 2015/0314434 A1* | 11/2015 | Bevins, Jr. | H02G 1/02 408/124 |
| 2020/0326706 A1* | 10/2020 | Hoare | B60R 11/04 |
| 2021/0132612 A1* | 5/2021 | Wang | G08G 5/0086 |
| 2021/0208603 A1* | 7/2021 | Tazume | B64C 39/024 |
| 2021/0405654 A1* | 12/2021 | Ulun | G05D 1/101 |

FOREIGN PATENT DOCUMENTS

WO    2018/155700 A1    8/2018

* cited by examiner

*Primary Examiner* — Hussein Elchanti
(74) *Attorney, Agent, or Firm* — Sughrue Mion, PLLC

(57) ABSTRACT

A control device (200) includes a ground vehicle controller (230) that causes a ground vehicle to travel at a target area, an acquirer (210) that acquires state information expressing a state of a surface of the target area while the ground vehicle travels the target area, and a determiner (240) that determines, based on the acquired state information, whether or not an aircraft is landable at the target area.

13 Claims, 22 Drawing Sheets

FIG. 7

PORT TABLE

| LATITUDE | LONGITUDE | USE FLAG |
|---|---|---|
| E139° XX′ | N35° XX′ | FALSE |
| ... | ... | ... |

CONTROL DEVICE, SYSTEM, AND METHOD

CROSS REFERENCE TO RELATED APPLICATIONS

This application is a National Stage of International Application No. PCT/W2019/034225 filed Aug. 30, 2019.

TECHNICAL FIELD

The present disclosure relates to a control device, a system, and a method.

BACKGROUND ART

In the related art, aircraft are known that autonomously fly on predetermined flight routes (for example, Patent Literature 1).

CITATION LIST

Patent Literature

Patent Literature 1: International Publication No. WO 2018/155700

SUMMARY OF INVENTION

Technical Problem

However, with the system of Patent Literature 1, although the aircraft must land after autonomously flying, a determination is not made, prior to landing and on the basis of the state of the surface of the target landing area, as to whether or not the aircraft is landable. Consequently, there are cases in which the aircraft is unlandable due to the state of the surface.

The present disclosure is made with the view of the above situation, and an objective of the present disclosure is to provide a control device, a system, and a method that can determine, prior to landing and on the basis of the state of the surface of the target area, whether or not an aircraft is landable at the target area.

Solution to Problem

A control device according to a first aspect of the present disclosure that achieves the objective described above includes:
  a ground vehicle controller that causes a ground vehicle to travel at a target area;
  an acquirer that acquires state information expressing a state of a surface of the target area while the ground vehicle travels the target area; and
  a determiner that determines, based on the acquired state information, whether or not an aircraft is landable at the target area.

Advantageous Effects of Invention

With the control device, the system, and the method according to the present disclosure, a determination can be made, prior to landing and on the basis of the state of a surface of a target area, as to whether or not an aircraft is landable at the target area.

BRIEF DESCRIPTION OF DRAWINGS

FIG. 7 is a drawing illustrating an example of a port table stored in the control device of the delivery system;

DESCRIPTION OF EMBODIMENTS

Embodiments

Hereinafter, embodiments of the present disclosure are described while referencing the attached drawings.

Figure 1:
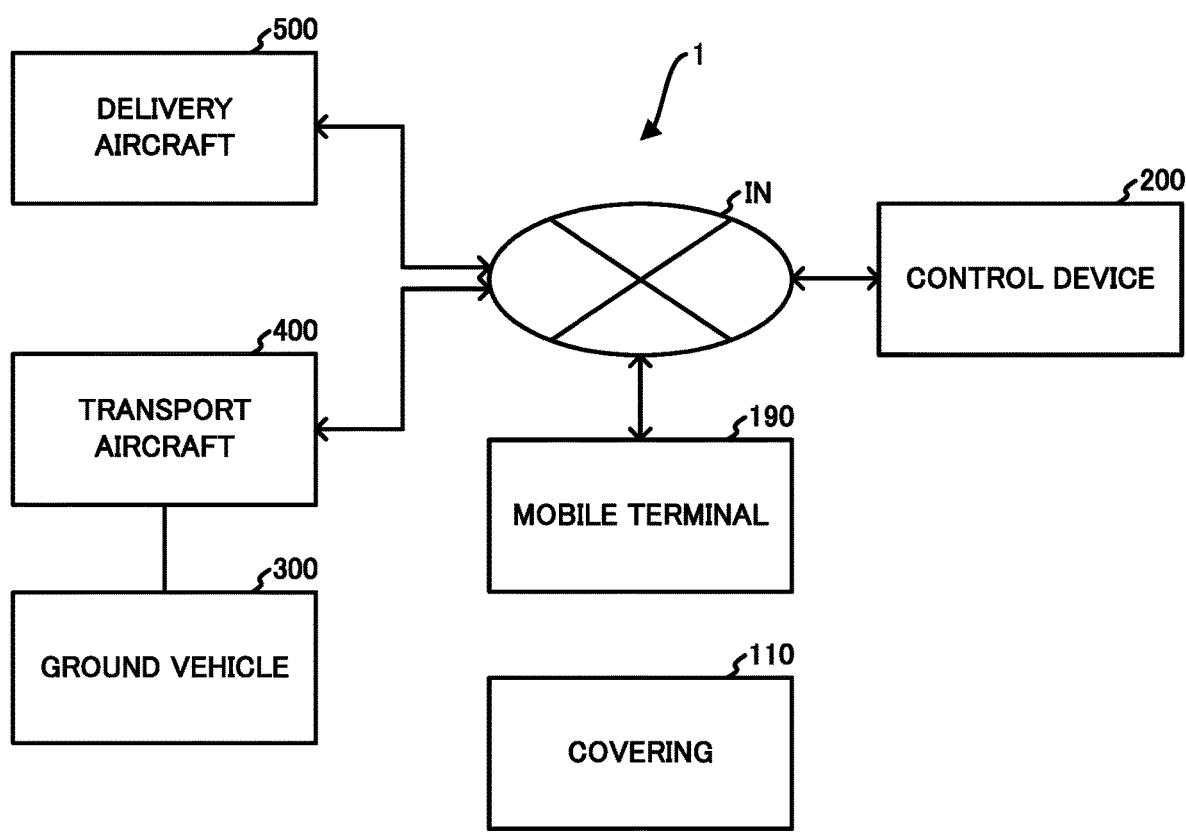
FIG. 1 is a system configuration drawing illustrating a configuration example of a delivery system according to an embodiment of the present disclosure.

A delivery system 1 according to an embodiment of the present disclosure includes a covering 110 such as illustrated in FIG. 1, and a mobile terminal 190. The covering 110 includes a mark indicating that a covered area is a location (hereinafter referred to as "port") at which an aircraft lands and takes off, and the covering 110 covers the target area to be used as a port. The mobile terminal 190 sends, via an internet IN, a request requesting that the target area be used as a port.

The delivery system 1 is installed at an office of a delivery company that is requested, by the request, to use the target area as a port, and includes a control device 200 that receives the request. Here, the delivery company is a business that delivers articles within a predetermined area.

Furthermore, in order to identify the state of the surface of the target area requested to be used as a port, the delivery system 1 includes a ground vehicle 300 that travels on the covering 110 covering the target area, and a transport aircraft 400 that transports the ground vehicle 300 to the target area. The traveling by the ground vehicle 300 and the transporting by the transport aircraft 400 are carried out in accordance with control by the control device 200. The control device 200 causes the ground vehicle 300 to travel on the covering 110 so that the control device 200 can indirectly measure the state of the surface, which cannot be directly measured due to being covered by the covering 110. This indirect measuring is carried out by bringing the covering 110 into close contact with the surface by the weight of the ground vehicle 300.

Furthermore, the delivery system 1 includes a delivery aircraft 500 that delivers an article to the target area when the control device 200 determines, on the basis of the indirectly measured state of the surface of the target area, to use the target area as a port.

A manager that manages the target area and that is to receive the article from the delivery aircraft 500 at the target area acquires the covering 110 from, for example, the office of the delivery company that is to deliver the article to the target area. A mark indicating that the target area is a port is drawn on the covering 110.

Figure 2:
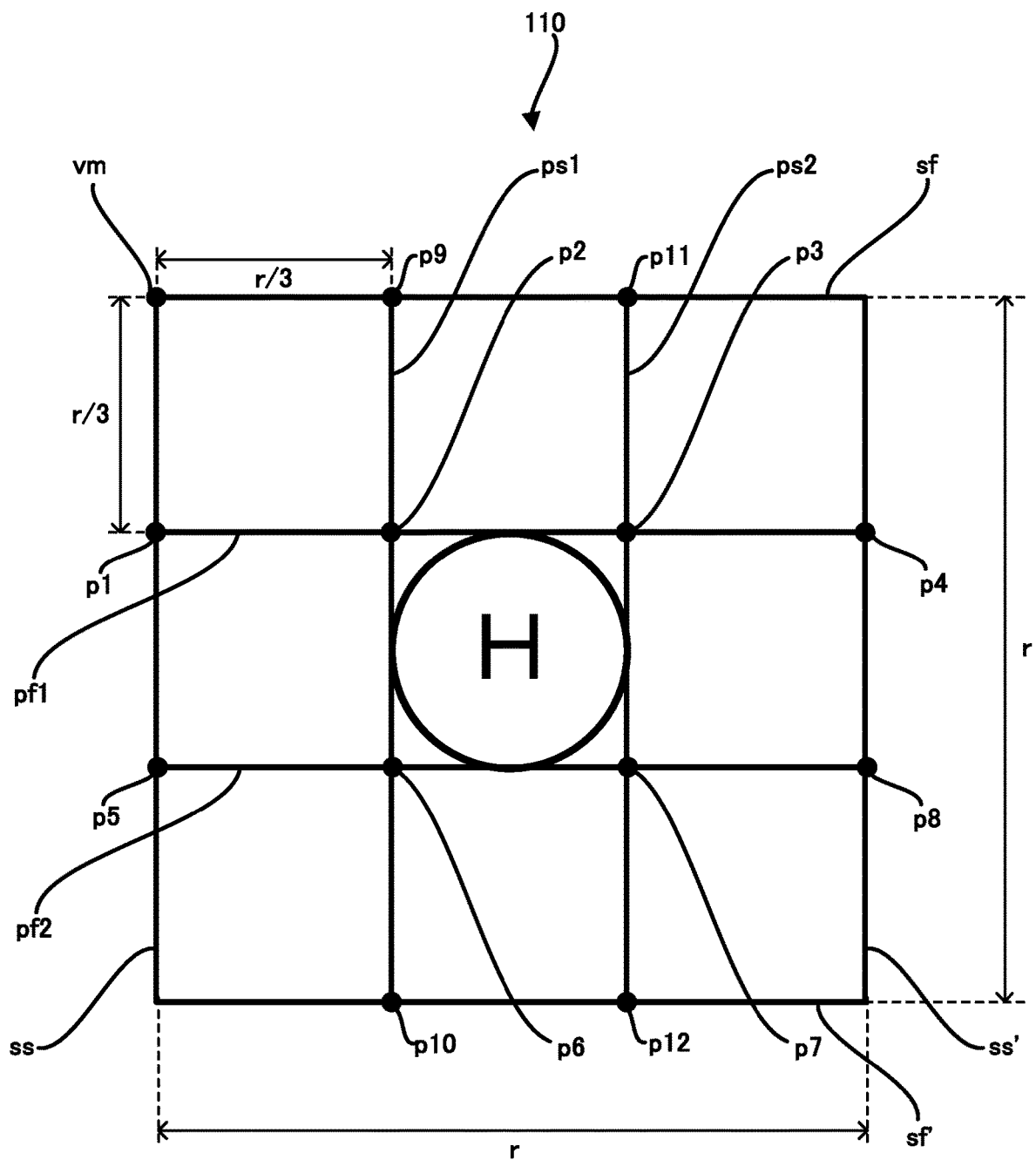
FIG. 2 is an appearance configuration drawing illustrating an example of the appearance of a covering.

The covering 110 is a square vinyl sheet in which one side is r meters, such as illustrated in FIG. 2. In a case in which one vertex of the covering 110 is defined as a reference vertex vm, and one of the two sides passing through the reference vertex vm is defined as a reference first side sf, linear patterns pf1 and pf2 are drawn on the covering 110 parallel to the reference first side sf, and distances of the patterns pf1 and pf1 from the reference first side sf are r/3 and 2r/3, respectively. Additionally, in a case in which, of the two sides passing through the reference vertex vm, the side other than the reference first side sf is defined as a reference second side ss, linear patterns ps1 and ps2 are drawn on the covering 110 parallel to the reference second side ss, and distances of the patterns ps1 and ps2 from the reference second side ss are r/3 and 2r/3, respectively. A grid-like pattern, obtained by combining the linear patterns pf1 and pf1 and ps1 and ps2, is drawn on the covering 110 in order to be used as a travel route for the ground vehicle 300 that travels on the covering 110.

The manager that has obtained the covering 110 on which the grid-like pattern is drawn spreads out the covering 110 on the surface of the target area with the side of the covering 110 on which the pattern is drawn facing up and, then, stakes near the four vertexes of the covering 110 with anchor pins to fix the covering 110 to the target area. Then, the manager performs, on the mobile terminal 190, an operation for sending the request requesting that the target area be used as a port.

Figure 3:
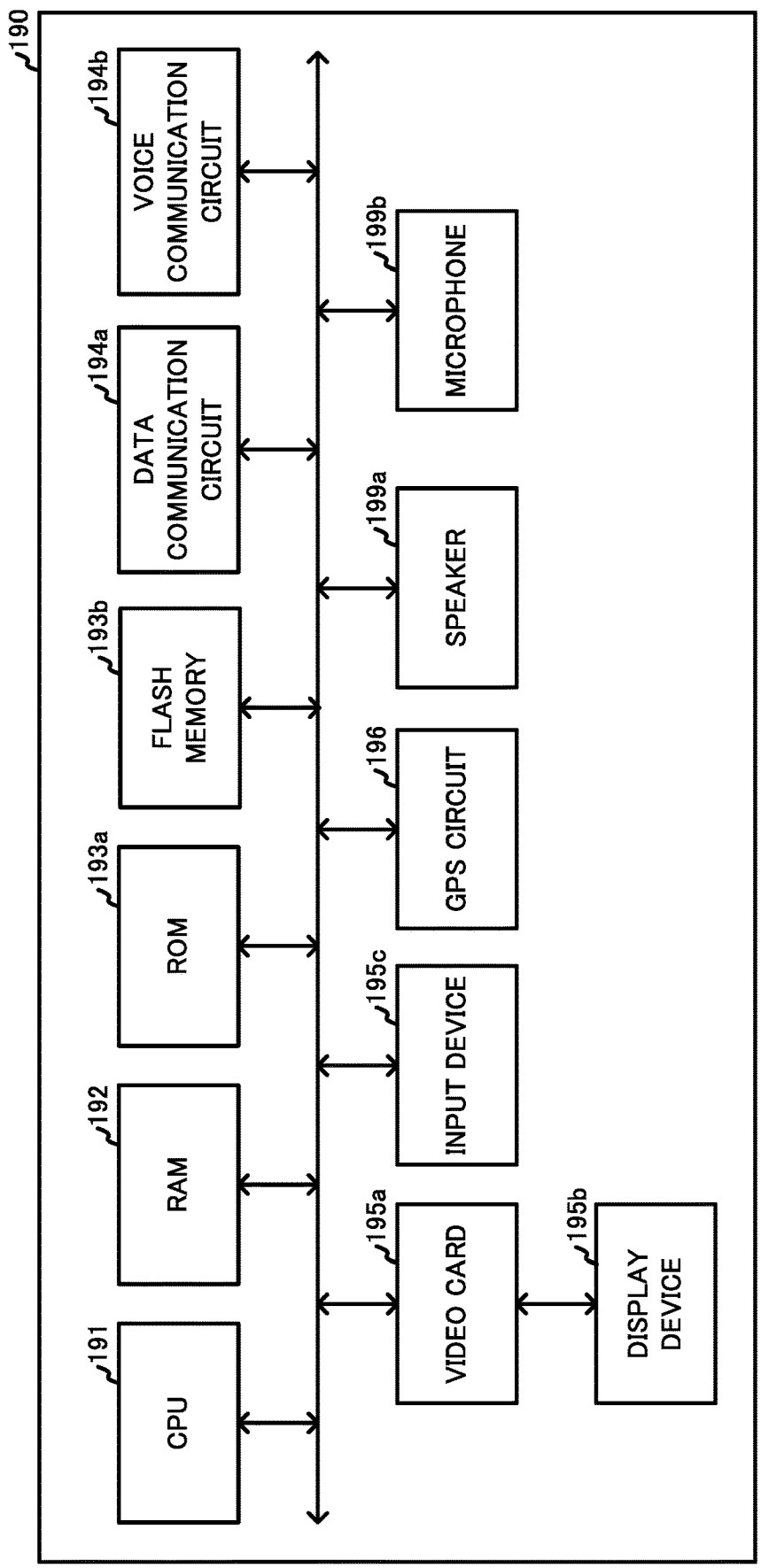
FIG. 3 is a hardware configuration drawing illustrating a configuration example of a mobile terminal.

As illustrated in FIG. 3, the mobile terminal 190 includes a central processing unit (CPU) 191, a random access memory (RAM) 192, a read only memory (ROM) 193a, a flash memory 193b, a data communication circuit 194a, a voice communication circuit 194b, a video card 195a, a display device 195b, an input device 195c, a global positioning system (GPS) circuit 196, a speaker 199a, and a microphone 199b.

The CPU 191 carries out total control of the mobile terminal 190 by executing programs stored in the ROM 193a or the flash memory 193b. The RAM 192 temporarily stores data to be processed at the times of execution of the programs by the CPU 191.

Various types of programs are stored in the ROM 193a and the flash memory 193b. The flash memory 193b also stores various types of data and tables in which data is stored that are used in the execution of the programs. The mobile terminal 190 may include a hard disk instead of the flash memory 193b.

The data communication circuit 194a is implemented as a network interface card (NIC) and, in one example, in accordance with a communication standard such as long term evolution (LTE) or 5th Generation (5G), carries out data communication using radio waves with a non-illustrated base station that is connected to the internet IN. Thus, the data communication circuit 194a of the mobile terminal 190 carries out data communication with the control device 200 that is connected to the internet IN. The voice communication circuit 194b carries out voice communication with the non-illustrated base station using radio waves.

The video card 195a renders images on the basis of digital signals output from the CPU 191, and outputs image signals that represent the rendered images. The display device 195b is implemented as an electroluminescence (EL) display, and displays images in accordance with the image signals output from the video card 195a. The mobile terminal 190 may include a plasma display panel (PDP) or a liquid crystal panel (LCD) instead of the EL display. The input device 195c is implemented as one or more of a button and a touch panel, and inputs signals corresponding to operations by the manager that uses the mobile terminal 190.

The GPS circuit 196 receives a GPS signal emitted from a GPS satellite, measures the latitude and longitude expressing the location of the mobile terminal 190 on the basis of the emitted GPS signal, and outputs a signal expressing the measured latitude and longitude.

The speaker 199a outputs sound in accordance with signals output by the CPU 191, and the microphone 199b inputs signals expressing ambient sound.

When the input device 195c of the mobile terminal 190 inputs a signal corresponding to the operation by the manager, the CPU 191 acquires the signal output from the GPS circuit 196. Next, the CPU 191 generates a request that includes information expressing the latitude and information expressing the longitude of the mobile terminal 190 expressed in the acquired signal, and that requests that the target area located at the latitude and the longitude be used as a port. Then, the CPU 191 outputs the generated request to the data communication circuit 194a with the control device 200 as the destination, and the data communication circuit 194a sends the request to the control device 200.

Figure 4:
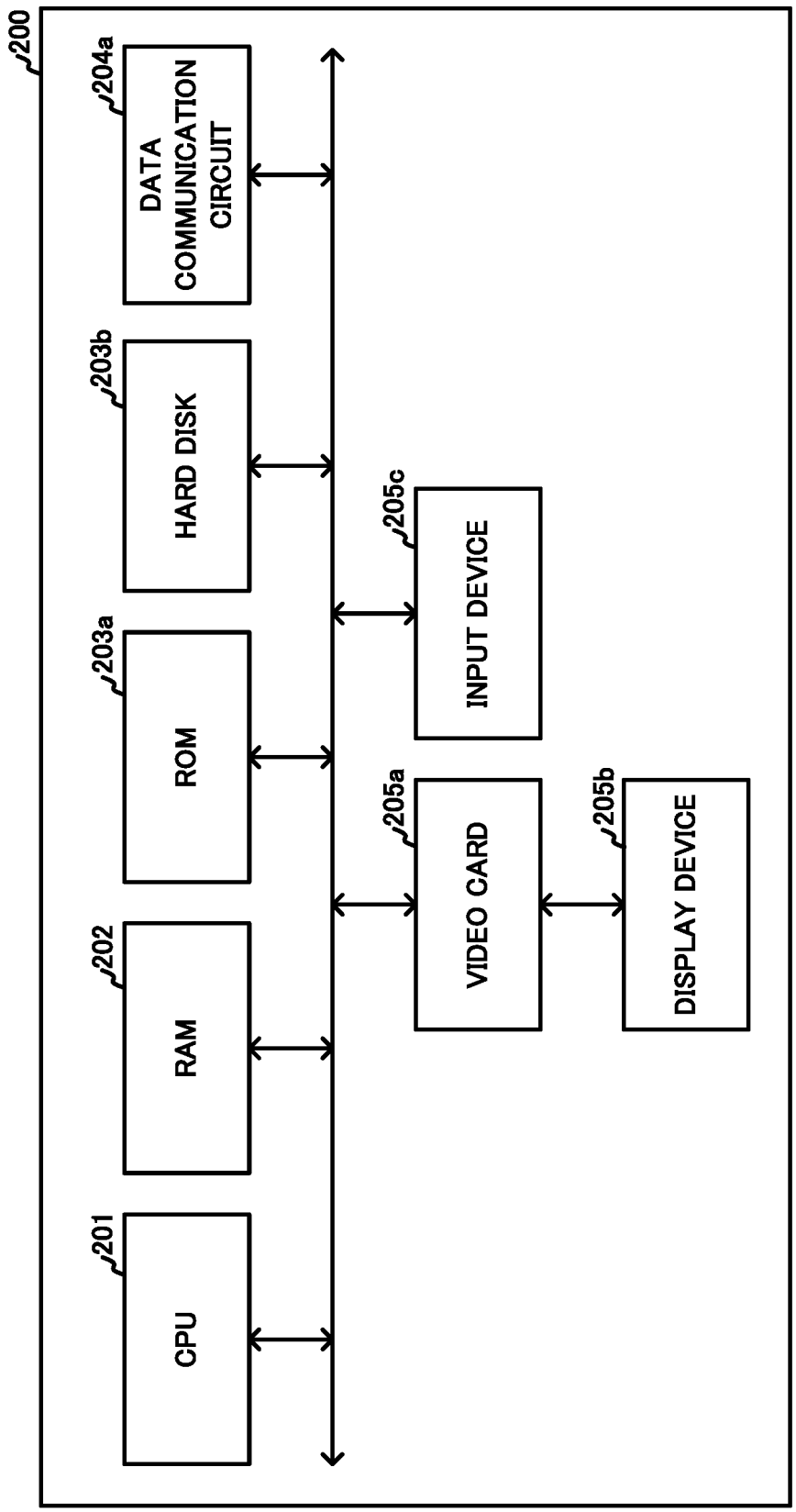
FIG. 4 is a hardware configuration drawing illustrating a configuration example of a control device of the delivery system.

The control device 200 is a server device and, as illustrated in FIG. 4, includes a CPU 201, a RAM 202, a ROM 203a, a hard disk 203b, a data communication circuit 204a, a video card 205a, a display device 205b, and an input device 205c. The configurations and functions of the CPU 201, the RAM 202, the ROM 203a, the video card 205a, the display device 205b, and the input device 205c of the control device 200 are the same as the configurations and functions of the CPU 191, the RAM 192, the ROM 193a, the video card 195a, the display device 195b, and the input device 195c of the mobile terminal 190 illustrated in FIG. 3. The input device 205c may be implemented as one or more of a keyboard, a mouse, a touch pad, and a button.

The hard disk 203b of the control device 200 stores various types of programs, and various types of data and tables in which data is stored that are used in the execution of the various types of programs. The control device 200 may include flash memory instead of the hard disk 203b.

The data communication circuit 204a of the control device 200 is implemented as an NIC and, in one example, carries out wireless data communication, in accordance with a communication standard such as LTE or 5G, with the mobile terminal 190, the transport aircraft 400, and the delivery aircraft 500 that are connected to the internet IN.

Figure 5:
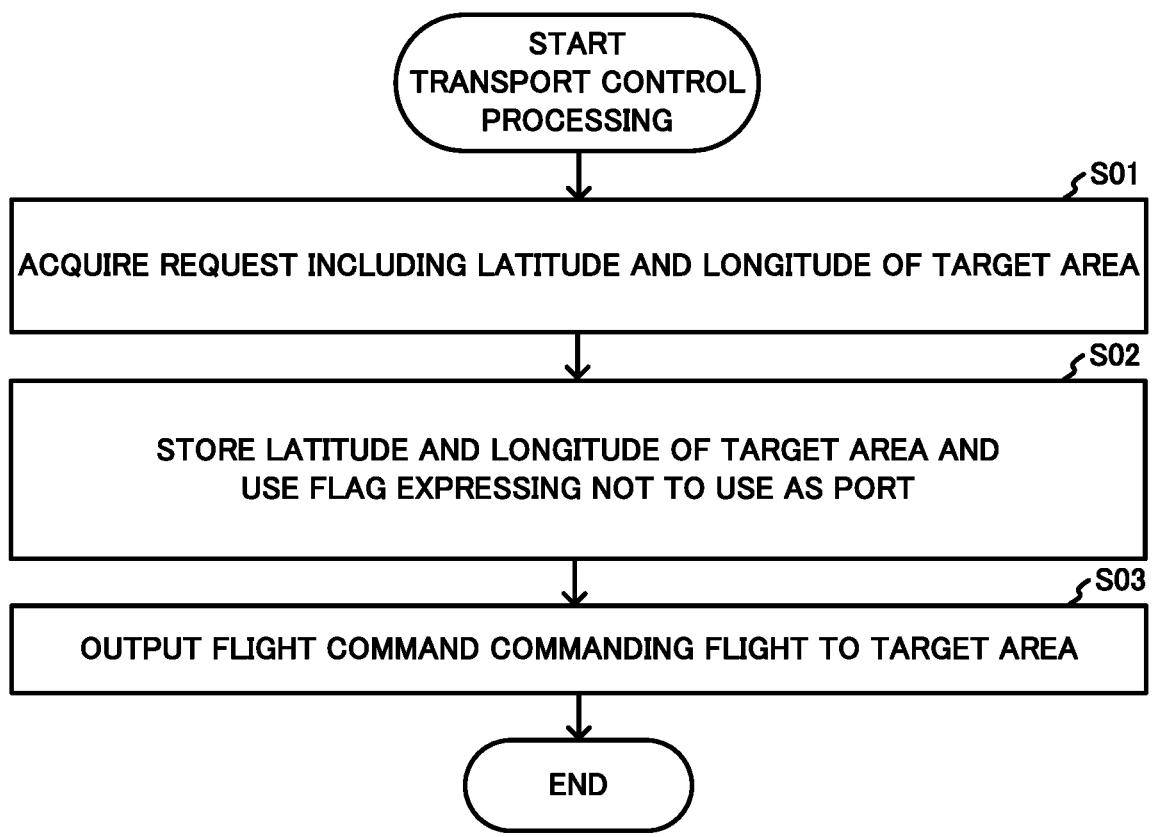
FIG. 5 is a flowchart illustrating an example of transport control processing executed by the control device of the delivery system.
Figure 6:
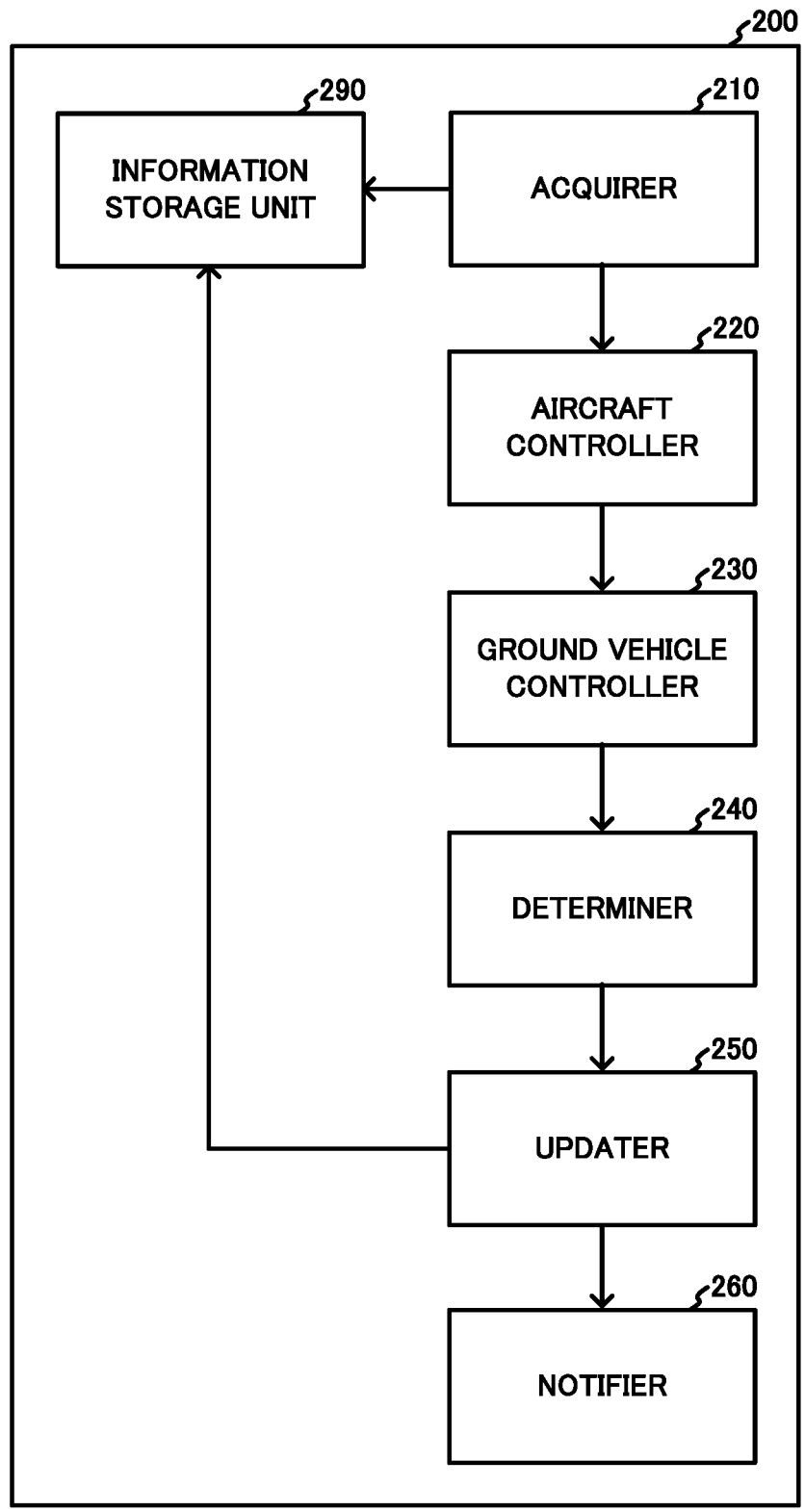
FIG. 6 is a functional block drawing illustrating an example of the functions of the control device of the delivery system.

When the data communication circuit 204a of the control device 200 receives the request requesting that the target area be used as a port, the CPU 201 of the control device 200 executes transport control processing such as illustrated in FIG. 5 for causing the transport aircraft 400 to transport the ground vehicle 300 to the target area. Thus, the CPU 201 functions as an acquirer 210 such as illustrated in FIG. 6 that acquires the received request from the data communication circuit 204a, and as an aircraft controller 220 that carries out control for causing the transport aircraft 400 to transport the ground vehicle 300 to the target area located at the latitude and longitude included in the acquired request.

The hard disk 203b functions as an information storage 290 in which a port table such as illustrated in FIG. 7 is stored. Data related to the target area to be used as a port is stored in the port table. The information expressing the latitude of the target area, the information expressing the longitude of the target area, and a use flag indicating whether or not the target area is to be used as a port are associated and stored in the port table of FIG. 7.

When the execution of the transport control processing illustrated in FIG. 5 starts, the acquirer 210 acquires the request from the data communication circuit 204a (step S01), and acquires the information expressing the latitude and the information expressing the longitude of the target area that are included in the request.

Next, the acquirer 210 associates the acquired information expressing the latitude, the information expressing the longitude, and the use flag indicating that the target area located at that latitude and longitude is not to be used as a port, and stores the associated information in the port table of FIG. 7 (step S02). The use flag indicating that the target area is not to be used as a port is stored because a determination has not been made as to whether or not the target area is to be used as a port.

Next, the aircraft controller 220 carries out control that causes the transport aircraft 400 to transport the ground vehicle 300 to the target area. To realize this control, the aircraft controller 220 generates a flight command that includes the information expressing the latitude and the information expressing the longitude of the target area, and that commands flight to the target area; and outputs the generated flight command to the data communication circuit 204a with the transport aircraft 400 as the destination (step S03). Thereafter, the data communication circuit 204a sends the flight command to the transport aircraft 400 and, then, the aircraft controller 220 ends the execution of the transport control processing.

Figure 8:
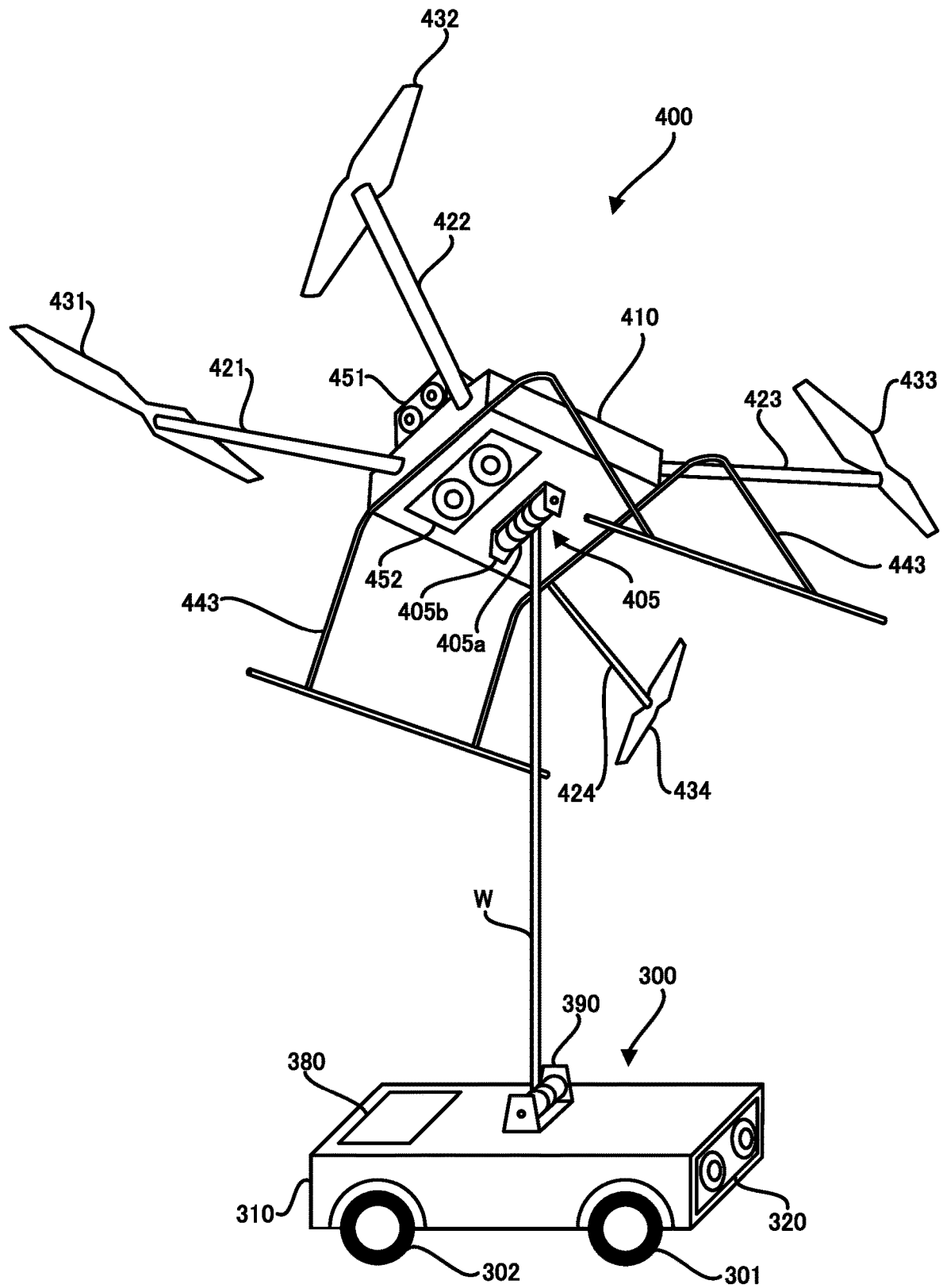
FIG. 8 is an appearance configuration drawing illustrating an example of the appearances of a ground vehicle and a transport aircraft.

The ground vehicle 300 transported by the transport aircraft 400 is an unmanned ground vehicle such as illustrated in FIG. 8. The ground vehicle 300 includes a vehicle body 310 that is provided with a plurality of wheels including wheels 301 and 302, and an imaging device 320 that is installed on a front surface of the vehicle body 310 in a state in which the optical axis of a non-illustrated lens is directed in front of the vehicle body 310. In the present specification, the optical axis of an imaging device such as, for example, the imaging device 320 being directed in a specific direction such as, for example, in front of the vehicle body 310 is described as encompassing changing the optical axis such that at least a portion of a subject located in that specific direction is included in the imaging range of the imaging device.

The ground vehicle 300 includes a control device 380 mounted on the vehicle body 310. The control device 380 drives, on the basis of the images output by the imaging device 320, a non-illustrated motor installed in each of the plurality of wheels so that the ground vehicle 300 travels while avoiding obstacles.

The imaging device 320 is implemented as a digital stereo camera. The imaging device 320 images in front of the ground vehicle 300 in accordance with signals output from the control device 380, and outputs two images obtained by the imaging that have parallax with each other to the control device 380. The imaging device 320 outputs the two images that have parallax with each other to the control device 380 because the control device 380 identifies, on the basis of the parallax, the positional coordinates in three-dimensional space, the size, and the like of obstacles in front of the ground vehicle 300.

Figure 9:
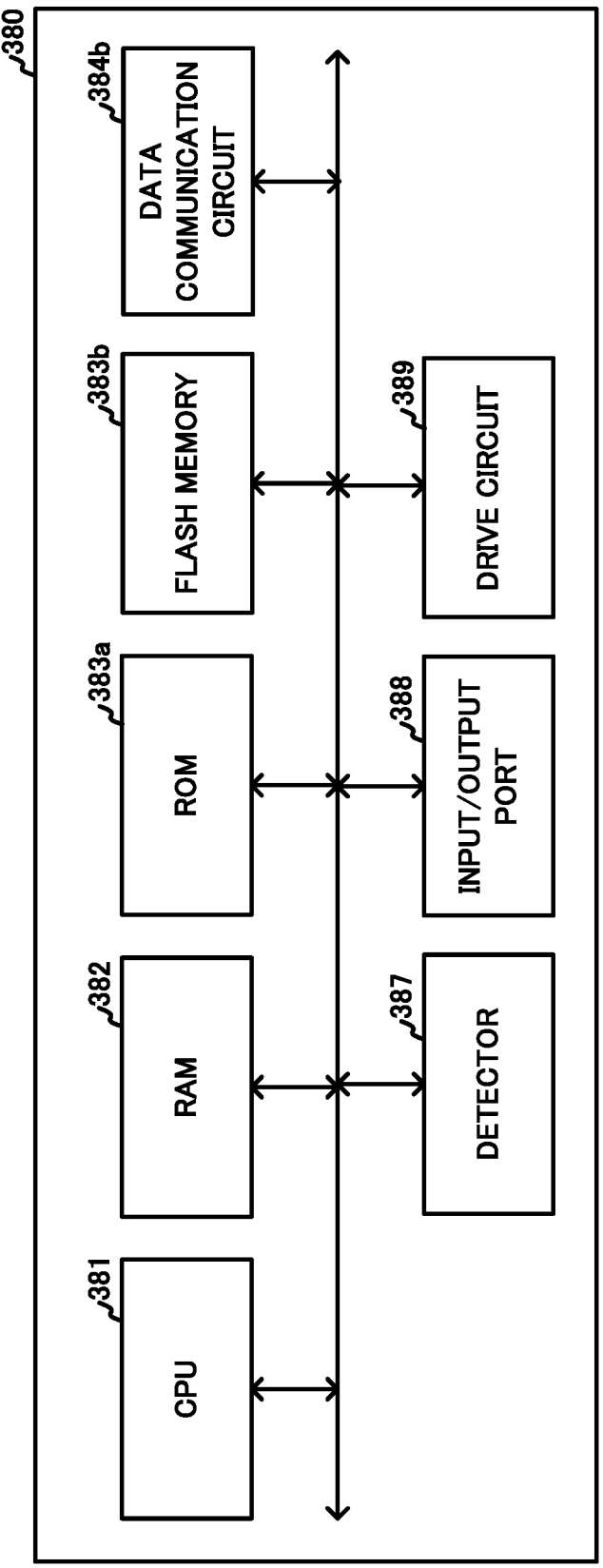
FIG. 9 is a hardware configuration drawing illustrating a configuration example of a control device of the ground vehicle.

As illustrated in FIG. 9, the control device 380 includes a CPU 381, a RAM 382, a ROM 383a, a flash memory 383b, a data communication circuit 384b, a detector 387, an input/output port 388, and a drive circuit 389. The configurations and functions of the CPU 381, the RAM 382, the ROM 383a, and the flash memory 383b of the control device 380 are the same as the configurations and the functions of the CPU 191, the RAM 192, the ROM 193a, and the flash memory 193b of the mobile terminal 190 illustrated in FIG. 3.

The data communication circuit 384b is implemented as an NIC and carries out data communication with the transport aircraft 400 wirelessly or via a non-illustrated cable.

The detector 387 is implemented as an attitude sensor, detects, as an attitude angle expressing the attitude of the ground vehicle 300, the smallest angle formed between the horizontal plane and the forward direction that is the advancing direction of the ground vehicle 300, and outputs a signal expressing the detected attitude angle to the CPU 381. The detector 387 detects a positive attitude angle when the advancing direction of the ground vehicle 300 is a diagonally upward direction between the horizontal direction and the vertically upward direction, and detects a negative attitude angle when the advancing direction of the ground vehicle 300 is a diagonally downward direction between the horizontal direction and the vertically downward direction.

The input/output port 388 is connected to a non-illustrated cable that is connected to the imaging device 320 installed on the front surface of the vehicle body 310, outputs the signals output by the CPU 381 to the imaging device 320, and inputs the two images output by the imaging device 320 into the CPU 381.

The drive circuit 389 is connected by cables connected to each of the non-illustrated plurality of motors that rotate each of the plurality of wheels including the wheels 301 and 302, and drives the plurality of motors in accordance with signals output by the CPU 381.

The ground vehicle 300 includes, on an upper surface of the vehicle body 310, a fixing fixture 390 that fixes one end of a wire W. The other end of the wire W is connected to the transport aircraft 400. As such, when, after the ground vehicle 300 is lowered to the target area by the transport aircraft 400, the data communication circuit 384b receives, from the transport aircraft 400, a travel command commanding travel, the CPU 381 of the ground vehicle 300 outputs, to the drive circuit 389, a control signal for traveling the target area in accordance with the received travel command.

The transport aircraft 400 that is physically connected by the wire W is an unmanned aircraft, and includes a control device 410 such as illustrated in FIG. 8. The control device 410 includes, on a bottom surface, a winch 405 that winds and unwinds the wire W. The control device 410 controls the winding and unwinding of the winch 405.

The winch 405 includes a drum 405a on which the wire W is wound, a support member 405b that supports a protrusion that protrudes outward in substantially the horizontal direction from both side surfaces of the drum 405a, and a non-illustrated motor that rotates the drum 405 a in a winding direction that winds the wire W and an unwinding direction that unwinds the wire W.

The transport aircraft 400 includes propeller arms 421, 422 and 423, 424 that respectively protrude forward to the right and forward to the left from the front face of the control device 410, and backward to the left and backward to the right from the back face of the control device 410. Furthermore, the transport aircraft 400 includes propellers 431 to 434 that are installed on tips of the propeller arms 421 to 424, and non-illustrated motors that rotate the propellers 431 to 434 in accordance with control by the control device 410.

Furthermore, the transport aircraft 400 includes a support leg 443 that protrudes downward from the bottom surface of the control device 410 and that supports the control device 410. The length in the vertical direction of the support leg 443 is designed to be longer, by a predetermined length, than the length in the vertical direction of the ground vehicle 300. The support leg 443 is set in this manner in order to prevent the ground vehicle 300 from colliding with the surface of the target area when the transport aircraft 400 lands at the target area.

Furthermore, the transport aircraft 400 includes an imaging device 451 that is provided on a top surface of the control device 410 and that has an optical axis that is directed in front of the transport aircraft 400, and an imaging device 452 that is provided on the bottom surface of the control device 410 and that has an optical axis that is directed vertically downward from the transport aircraft 400. The imaging devices 451 and 452 are implemented as digital stereo cameras. The imaging devices 451 and 452 perform imaging in accordance with signals output from the control device 410, and output two images obtained by imaging that have parallax with each other to the control device 410.

The imaging device 451 outputs the two images obtained by imaging in front of the transport aircraft 400 to the control device 410 in order for the control device 410 to identify, on the basis of the parallax, the positional coordinates in three-dimensional space, the size, and the like of obstacles in front of the transport aircraft 400.

The imaging device 452 outputs the two images obtained by imaging vertically downward to the control device 410 in order for the control device 410 to identify, on the basis of the parallax, an altitude that is a distance from the transport aircraft 400 to the ground or floor.

Figure 10:
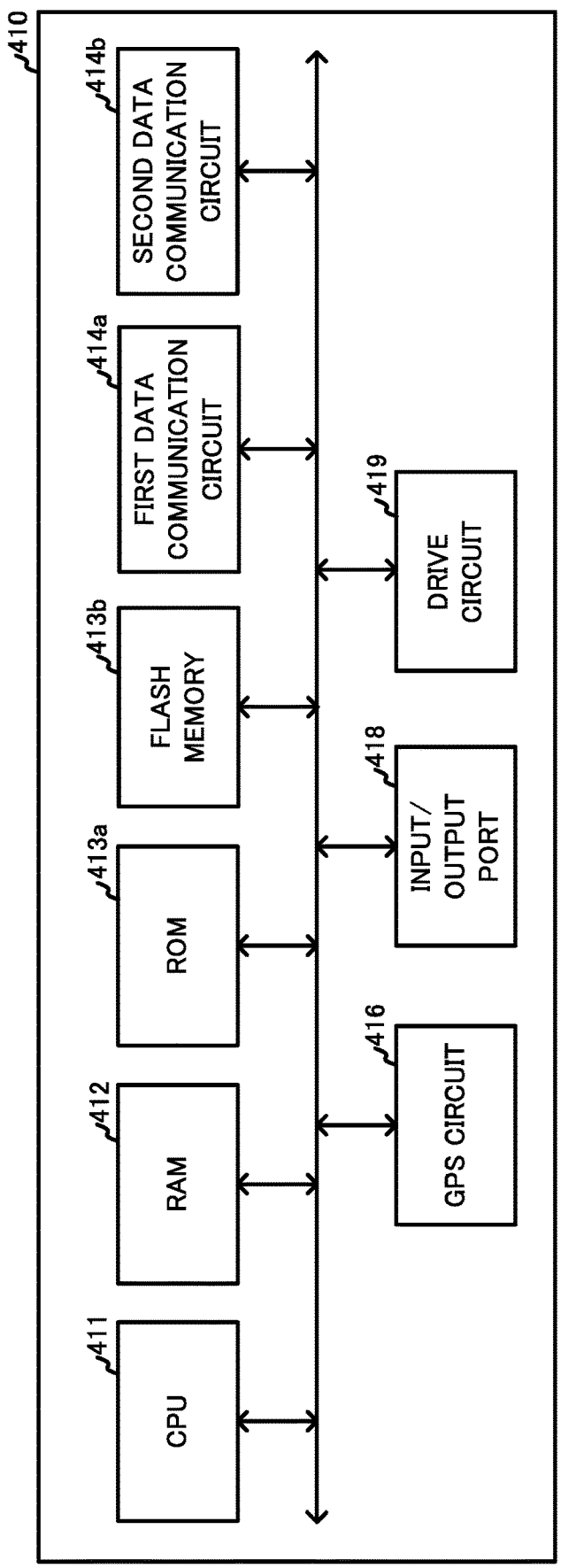
FIG. 10 is a hardware configuration drawing illustrating a configuration example of a control device of the transport aircraft.

As illustrated in FIG. 10, the control device 410 includes a CPU 411, a RAM 412, a ROM 413a, a flash memory 413b, a first data communication circuit 414a, a second data communication circuit 414b, a GPS circuit 416, an input/output port 418, and a drive circuit 419.

The configurations and functions of the CPU 411, the RAM 412, the ROM 413a, the flash memory 413b, and the GPS circuit 416 of the control device 410 of the transport aircraft 400 are the same as the configurations and functions of the CPU 191, the RAM 192, the ROM 193a, the flash memory 193b, and the GPS circuit 196 of the mobile terminal 190 illustrated in FIG. 3.

The first data communication circuit 414a and the second data communication circuit 414b are implemented as NICs, and the first data communication circuit 414a carries out, in accordance with a communication standard such as LTE or 5G, data communication wirelessly with the control device 200 that is connected via the internet IN. The second data communication circuit 414b carries out data communication with the ground vehicle 300 wirelessly or via a non-illustrated cable.

The input/output port 418 is connected to non-illustrated cables that are respectively connected to the imaging devices 451 and 452 illustrated in FIG. 8, outputs signals output by the CPU 411 to the imaging devices 451 and 452, and inputs images output by the imaging devices 451 and 452 into the CPU 411.

The drive circuit 419 is connected to non-illustrated cables that are respectively connected to the non-illustrated motor that rotates the drum 405a of the winch 405 illustrated in FIG. 8, and the non-illustrated motors that rotate the propellers 431 to 434. The drive circuit 419 drives, in accordance with signals output by the CPU 411, the non-illustrated motor that rotates the drum 405a and the non-illustrated motors that rotate the propellers 431 to 434.

Figure 11:
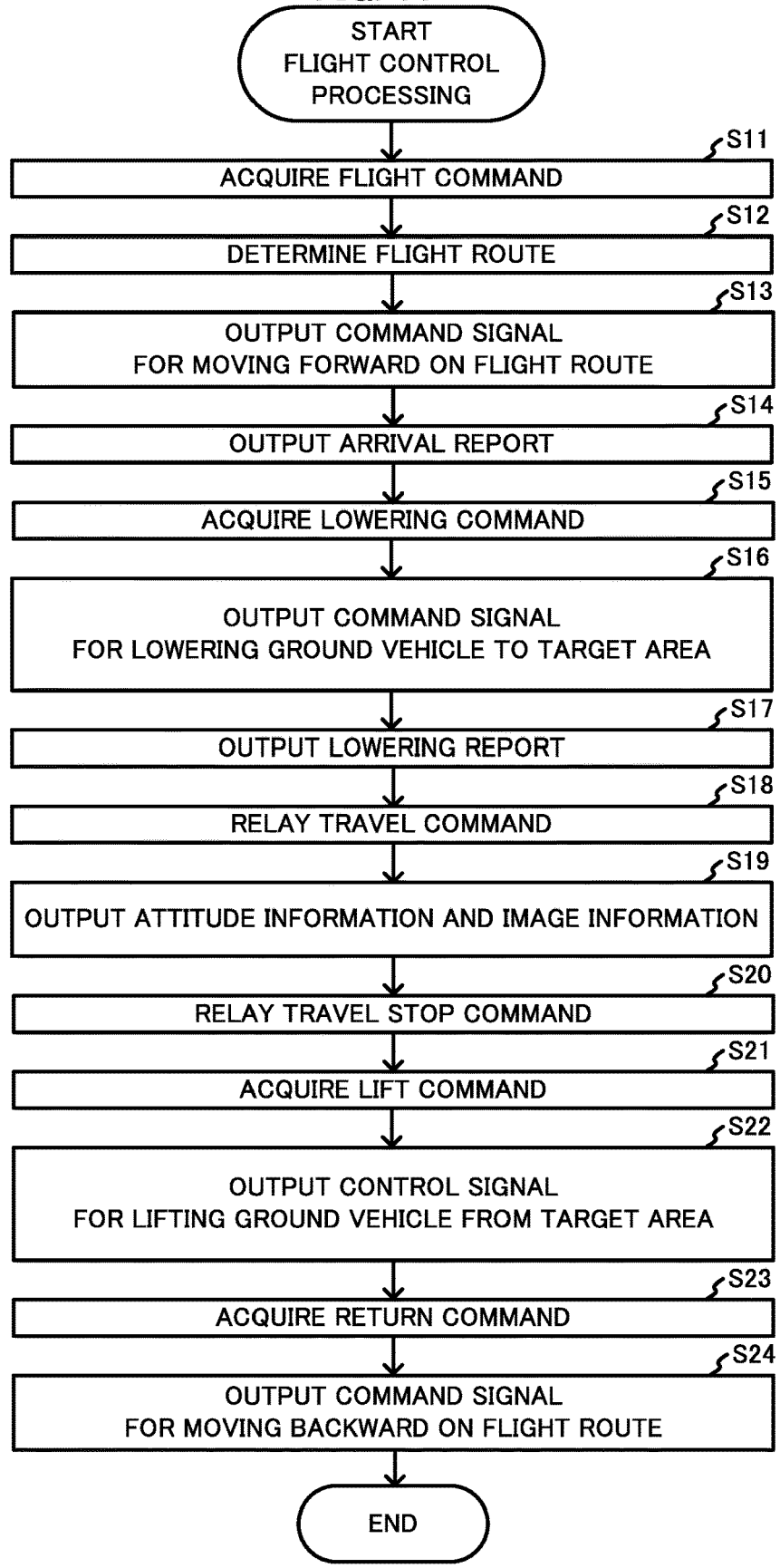
FIG. 11 is a flowchart illustrating an example of flight control processing executed by the transport aircraft.

When the first data communication circuit 414a of the transport aircraft 400 receives, from the control device 200, the flight command commanding flight to the target area, the CPU 411 of the transport aircraft 400 executes flight control processing such as illustrated in FIG. 11 in which the non-illustrated motors that rotate the propellers 431 to 434 are controlled in order to fly in accordance with the flight command.

When the execution of the flight control processing starts, the CPU 411 of the transport aircraft 400 acquires the flight command from the first data communication circuit 414a (step S11), and acquires the information expressing the latitude and the information expressing the longitude of the target area that are included in the acquired flight command. Next, the CPU 411 of the transport aircraft 400 identifies the latitude and longitude of the transport aircraft 400 on the basis of a signal output from the GPS circuit 416.

Then, the CPU 411 of the transport aircraft 400 reads a plurality of records from a non-illustrated partial route table in which information related to partial routes on which the transport aircraft 400 can move, such as roads and rivers, for example, is stored in advance. The partial route table is stored in advance in the flash memory 413b. The latitude and longitude of a start node of a partial route, the latitude and longitude of an end node of the partial route, and a length of an edge that is the partial route are associated and stored in advance in each record of the partial route table.

The CPU 411 of the transport aircraft 400 executes a route search algorithm such as, for example, Dijkstra's algorithm using the identified latitude and longitude of the transport aircraft 400, the length of the edge that is the partial route and the latitude and longitude of the nodes stored in each of the read plurality of records, and the latitude and longitude of the target area. Thus, the CPU 411 calculates the shortest total route from the office where the transport aircraft 400 is located to the target area requested to be used as a port, and determines the calculated total route as a flight route (step S12).

Next, in order to cause the transport aircraft 400 to move forward on the flight route, the CPU 411 of the transport aircraft 400 acquires a signal from the GPS circuit 416, and generates a control signal that causes the transport aircraft 400 to fly so as to reduce the difference between the latitude and longitude of the transport aircraft 400 expressed in the acquired signal and the latitude and longitude of the closest node of the plurality of un-passed nodes included in the flight route. Thereafter, the CPU 411 outputs the generated control signal to the drive circuit 419 that drives the non-illustrated motors that rotate the propellers 431 to 434 (step S13). Next, as long as there are un-passed nodes, the CPU 411 of the transport aircraft 400 repeats the processing described above from the process of acquiring a signal from the GPS circuit 416.

Thereafter, when there are no un-passed nodes left, the CPU 411 of the transport aircraft 400 determines that the transport aircraft 400 has arrived at the target area. Next, the CPU 411 generates an arrival report that includes the information expressing the latitude and the information expressing the longitude of the target area and that notifies that the transport aircraft 400 has arrived at the target area, and outputs the generated arrival report to the first data communication circuit 414*a* with the control device 200 as the destination (step S14).

The first data communication circuit 414*a* of the transport aircraft 400 sends the arrival report notifying of the arrival at the target area to the control device 200 and, then, receives, from the control device 200, a lowering command commanding the transport aircraft 400 to lower the ground vehicle 300 to the target area while the transport aircraft 400 is flying above the target area.

Thereafter, the CPU 411 of the transport aircraft 400 acquires the lowering command from the first data communication circuit 414*a* (step S15) and, in accordance with the acquired lowering command, reads information expressing a predetermined altitude H from the flash memory 413*b*. The predetermined altitude H is a minimum value of an altitude at which the entire covering 110 covering the target area is included in the angle of view of the imaging device 452 of the transport aircraft 400 that has an optical axis directed vertically downward from the transport aircraft 400. Next, the CPU 411 generates a control signal for hovering or circling at the altitude H above the target area, and outputs the generated control signal to the drive circuit 419.

Next, in order to lower the ground vehicle 300 to the target area, the CPU 411 of the transport aircraft 400 generates a control signal that causes the drum 405*a* of the winch 405 to rotate in the unwinding direction so as to lower the ground vehicle 300 a distance H, and outputs the generated control signal to the drive circuit 419 (step S16).

Thereafter, the CPU 411 generates a control signal that causes the drum 405*a* of the winch 405 to further rotate so as to unwind the wire W a distance L and outputs the generated control signal to the drive circuit 419, The transport aircraft 400 further unwinds the wire W the distance L in order to prevent the wire W connected to the ground vehicle 300 from obstructing the travel of the ground vehicle 300 at the target area.

Figure 12:
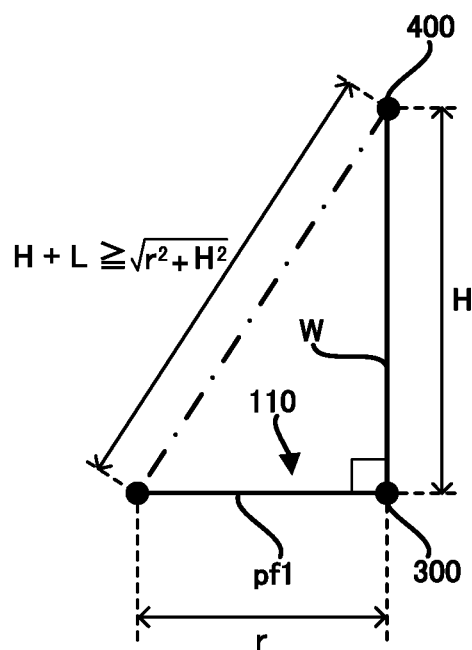
FIG. 12 is a drawing illustrating an example of the relationship between the transport aircraft, a wire connecting the transport aircraft to the ground vehicle, and a travel route on which the ground vehicle travels.

The distance L may be any distance provided that it is longer than a value obtained by subtracting a length H of the opposite side from the length $(r2+H2)^{1/2}$ of the hypotenuse of a right triangle, such as illustrated in FIG. 12. Here, the opposite side of the right triangle has a length of the altitude H that is the distance from the transport aircraft 400 to the covering 110, and the adjacent side of the right triangle has a length r of the linear patterns pf1, p12, ps1, and ps2 drawn on the covering 110. The distance L is determined in this manner so that the ground vehicle 300, which is connected by the wire W to the transport aircraft 400 that is hovering or the like at the altitude H, travels on the travel route expressed by the linear patterns pf1, p12, ps1, and ps2. In the present embodiment, it is described that the distance L is a distance longer than $(r2+H2)^{1/2}-H$. However, the distance L is not limited thereto, and the distance L may be any distance, provided that the wire W does not obstruct, or mostly does not obstruct, the traveling of the ground vehicle 300 at the target area.

Thereafter, the CPU 411 of the transport aircraft 400 generates a lowering report informing that the ground vehicle 300 has been lowered to the surface of the target area, and outputs the generated lowering report to the first data communication circuit 414*a* with the control device 200 as the destination (step S17).

The first data communication circuit 414*a* of the transport aircraft 400 sends the lowering report to the control device 200 and, then, receives a travel command commanding the ground vehicle 300 to travel at the target area while the transport aircraft 400 is flying.

When the travel command is acquired from the first data communication circuit 414*a*, the CPU 411 of the transport aircraft 400 continuously outputs, to the drive circuit 419 and in accordance with the travel command, a control signal that causes the transport aircraft 400 to hover or circle at the altitude H above the target area until the first data communication circuit 414*a* receives a travel stop command commanding the stopping of the traveling. Thus, the transport aircraft 400 continues to hover or circle while the ground vehicle 300 is traveling.

Thereafter, the CPU 411 of the transport aircraft 400 relays the travel command by outputting the acquired travel command to the second data communication circuit 414*b* with the ground vehicle 300 as the destination (step S18).

In the present embodiment, the travel command is a command that causes the ground vehicle 300 to travel four travel routes expressed by the linear patterns pf1, pf2, ps1, and ps2, respectively, drawn on the covering 110. As such, when the data communication circuit 384*b* of the ground vehicle 300 illustrated in FIG. 9 receives the travel command, the CPU 381 of the ground vehicle 300 outputs, to the imaging device 320 via the input/output port 388, a signal commanding that imaging be performed in order to cause the imaging device 320 to image the covering 110 spread out in front of the ground vehicle 300.

Next, the CPU 381 of the ground vehicle 300 acquires two captured images from the imaging device 320, and calculates the parallax from the two acquired images. Thereafter, the CPU 381 uses the calculated parallax to identify the positional coordinates in three-dimensional space of a plurality of points included in an un-traveled first route expressed by the pattern pf1. The plurality of points for which the positional coordinates are identified include points p1 to p4 such as illustrated in FIG. 2. The points p1 to p4 are crossing points between the pattern pf1, and the reference second side ss, the pattern ps1, the pattern ps2, and the side ss' opposite the reference second side ss.

Next, the CPU 381 uses the positional coordinates of the identified points p1 to p4 to output, via the drive circuit 389 to the non-illustrated plurality of motors that rotate the plurality of wheels including the wheels 301 and 302, a command signal for sequentially passing through the points p1 to p4 at a predetermined speed.

Thereafter, the CPU 381 of the ground vehicle 300 outputs, to the drive circuit 389, a command signal for sequentially passing through points p5 to p8. The points p5 to p8 are points included in an un-traveled second route expressed by the pattern pf2, and are crossing points between the pattern pf1, and the reference second side ss, the pattern ps1, the pattern ps2, and the side ss'.

Likewise, the CPU 381 of the ground vehicle 300 outputs a command signal for sequentially passing through a point p9, which is a crossing point between the pattern ps1 and the reference first side sf, the point p2, the point p6, and a point p10 that is a crossing point between the pattern ps1 and the side sf opposite the reference first side sf. Here, the points p9, p2, p6, and p10 are points that are included in an un-traveled third route expressed by the pattern ps1. Also likewise, the CPU 381 outputs a command signal for sequentially passing through a point p11, that is a crossing point between the pattern ps2 and the reference first side sf, the point p3, a point p7, and a point p12 that is a crossing point between the pattern ps2 and the side sf. Here, the points p11, p3, p7, and p12 are points that are included in an un-traveled fourth route expressed by the pattern ps2.

While the ground vehicle 300 is traveling on the covering 110, the CPU 381 of the ground vehicle 300 acquires, on a predetermined cycle, a signal output from the detector 387. Each time the signal is acquired, the CPU 381 outputs, to the data communication circuit 384b with the transport aircraft 400 as the destination, attitude information expressing the attitude angle of the ground vehicle 300 expressed in the acquired signal. Note that, the phrase "while the ground vehicle 300 is traveling on the covering 110" does not necessarily mean that the ground vehicle 300 is continuously traveling, and the ground vehicle 300 may be temporarily stopped on the covering 110.

Each time the second data communication circuit 414b of the transport aircraft 400 receives the attitude information from the ground vehicle 300, the CPU 411 of the transport aircraft 400 acquires that attitude information from the second data communication circuit 414b, and acquires, as the date and time at which the attitude of the ground vehicle 300 is detected, a system date and time managed by an operating system (OS), for example. Additionally, the CPU 411 outputs, to the first data communication circuit 414a with the control device 200 as the destination, the attitude information and date and time information expressing the acquired date and time.

While the ground vehicle 300 is traveling on the covering 110, the CPU 411 of the transport aircraft 400 outputs, on a predetermined cycle, a signal to the imaging device 452 of the transport aircraft 400, that has the optical axis directed vertically downward, commanding that imaging be performed. As a result, the imaging device 452 is caused to image, on the predetermined cycle, the covering 110 on which the ground vehicle 300 is situated. Additionally, each time the CPU 411 acquires, from the imaging device 452, image information expressing an image obtained by imaging, the CPU 411 acquires the system date and time managed by the OS as an imaging date and time that is the date and time at which the image is obtained by imaging. Moreover, the CPU 411 outputs the image information and the date and time information expressing the imaging date and time to the first data communication circuit 414a with the control device 200 as the destination (step S19).

Thereafter, when the first data communication circuit 414a of the transport aircraft 400 receives the travel stop command from the control device 200, the CPU 411 of the transport aircraft 400 outputs the travel stop command to the second data communication circuit 414b, thereby relaying the travel stop command to the ground vehicle 300 (step S20). When the data communication circuit 384b of the ground vehicle 300 receives the travel stop command, the CPU 381 of the ground vehicle 300 stops, in accordance with the travel stop command, the output of the control signal for traveling.

Thereafter, when the first data communication circuit 414a of the transport aircraft 400 receives, from the control device 200, a lift command commanding the transport aircraft 400 to lift the ground vehicle 300 from the target area while the transport aircraft 400 is flying, the CPU 411 of the transport aircraft 400 acquires the lift command from the first data communication circuit 414a (step S21). Thereafter, the CPU 411 generates, in accordance with the acquired lift command, a control signal for continuing the hovering or circling at the altitude H above the target area, and a control signal that causes the winch 405 to lift the ground vehicle 300 from the target area, and outputs the generated control signals to the drive circuit 419 (step S22).

Thereafter, when the first data communication circuit 414a of the transport aircraft 400 receives, from the control device 200, a return command commanding the transport aircraft 400 to return to the office, the CPU 411 of the transport aircraft 400 acquires the return command from the first data communication circuit 414a (step S23). Thereafter, the CPU 411 outputs a control signal, for returning to the office by flying back on the flight route in accordance with the acquired return command, to the drive circuit 419 (step S24), and ends the execution of the flight control processing.

Figure 13:
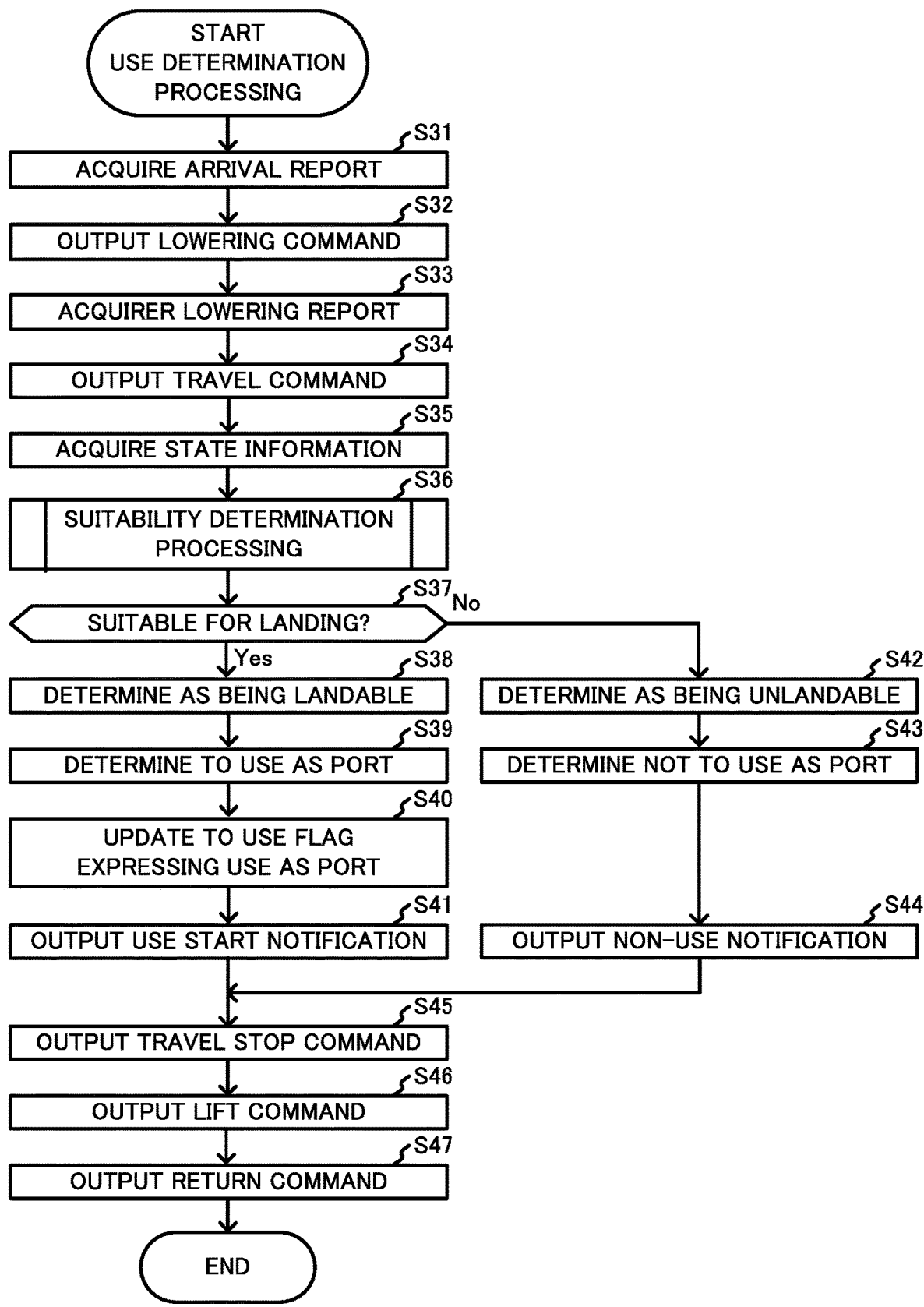
FIG. 13 is a flowchart illustrating an example of use determination processing executed by the control device of the delivery system.

When the data communication circuit 204a of the control device 200 illustrated in FIG. 4 receives the arrival report output in step S14 of FIG. 11, the CPU 201 of the control device 200 executes use determination processing such as illustrated in FIG. 13 in which a determination is made whether or not to use the target area where the transport aircraft 400 has arrived as a port.

In the present embodiment, a description is given in which, when the CPU 201 of the control device 200 determines that the delivery aircraft 500 is landable at the target area, a determination is made to use the target area as a port. The phrase "the delivery aircraft 500 is landable at the target area" does not simply mean that it is possible to land at the target area, but also means that the delivery aircraft 500 is safely landable at the target area. The phrase "the delivery aircraft 500 is safely landable at the target area" means that there is no possibility, or less than a predetermined possibility, of the delivery aircraft 500 toppling over when landing.

In the present embodiment, the CPU 201 of the control device 200 determines that the delivery aircraft 500 is safely landable at the target area when characteristics of the surface of the target area are suitable for the landing of the delivery aircraft 500. The characteristics of the surface include the size of an unevenness of the surface, the size of an incline of the surface, and a softness of the surface. Therefore, the phrase "the characteristics of the surface of the target area are suitable for the landing of the delivery aircraft 500"

includes that the unevenness of the surface is small, the incline of the surface is gentle, and the surface is hard enough such that there is no possibility, or less than a predetermined possibility, of the delivery aircraft 500 toppling over when the delivery aircraft 500 lands at the target area.

By executing the use determination processing of FIG. 13, the CPU 201 of the control device 200 functions as a ground vehicle controller 230 such as illustrated in FIG. 6 that causes the ground vehicle 300 to travel at the target area that is covered by the covering 110.

Additionally, the CPU 201 functions as a determiner 240 that determines, on the basis of the attitude angle of the ground vehicle 300 that is detected while the ground vehicle 300 travels the target area and changes in the covering 110 on which the ground vehicle 300 travels, whether or not the delivery aircraft 500 is landable at the target area.

Furthermore, the CPU 201 of the control device 200 functions as an updater 250 that, when a determination is made that the delivery aircraft 500 is landable at the target area, updates the use flag, stored in the port table of FIG. 7 in association with the information expressing the latitude and the information expressing the longitude of the target area, to a use flag indicating that the target area is to be used as a port.

Furthermore, the CPU 201 of the control device 200 functions as a notifier 260 that notifies the mobile terminal 190 of the result of the determination of whether or not to use the target area as a port.

When the execution of the use determination processing of FIG. 13 starts, the acquirer 210 of the control device 200 acquires the arrival report from the data communication circuit 204a (step S31), and acquires, from the acquired arrival report, the information expressing the latitude and the information expressing the longitude of the target area where the transport aircraft 400 has arrived.

Next, the aircraft controller 220 of the control device 200 outputs, to the data communication circuit 204a with the transport aircraft 400 as the destination, a lowering command commanding the lowering of the ground vehicle 300 to the target area while the transport aircraft 400 is flying (step S32).

Thereafter, the data communication circuit 204a of the control device 200 sends the lowering command to the transport aircraft 400 and then receives, from the transport aircraft 400, a lowering report informing that the ground vehicle 300 has been lowered to the surface of the target area.

Next, the acquirer 210 of the control device 200 acquires the lowering report from the data communication circuit 204a (step S33). Thereafter, the ground vehicle controller 230 outputs, to the data communication circuit 204a with the transport aircraft 400 as the destination, a travel command commanding the ground vehicle 300 to travel at the target area while the transport aircraft 400 is flying (step S34).

Next, the data communication circuit 204a of the control device 200 sends the travel command to the transport aircraft 400, and the transport aircraft 400 relays the travel command to the ground vehicle 300. Thereafter, the data communication circuit 204a receives, from the transport aircraft 400, pluralities of the attitude information expressing the attitude of the ground vehicle 300 that is traveling, and the date and time information expressing the detection date and time of that attitude. Additionally, the data communication circuit 204a receives, from the transport aircraft 400, pluralities of image information expressing an image obtained by imaging the covering 110 on which the ground vehicle 300 is situated, and date and time information expressing the imaging date and time.

Next, the acquirer 210 of the control device 200 acquires the pluralities of the attitude information and the date and time information from the data communication circuit 204a, and sets each of the acquired plurality of attitude information as state information expressing the state of the surface of the target area. The attitude information expressing the attitude of the ground vehicle 300 is set as the state information expressing the state of the surface of the target area because the attitude of the ground vehicle 300 changes depending on the state of the surface of the target area on which the ground vehicle 300 travels.

Additionally, the acquirer 210 acquires the pluralities of the image information and the date and time information from the data communication circuit 204a, and sets each of the acquired plurality of image information as the state information (step S35). The image information expressing the ground vehicle 300 situated on the covering 110 is set as the state information expressing the state of the surface of the target area because the covering 110 is brought into close contact with the surface of the target area due to the weight of the ground vehicle 300 and, as such, the state of the surface of the covering 110 expresses the state of the surface of the target area.

Figure 14:
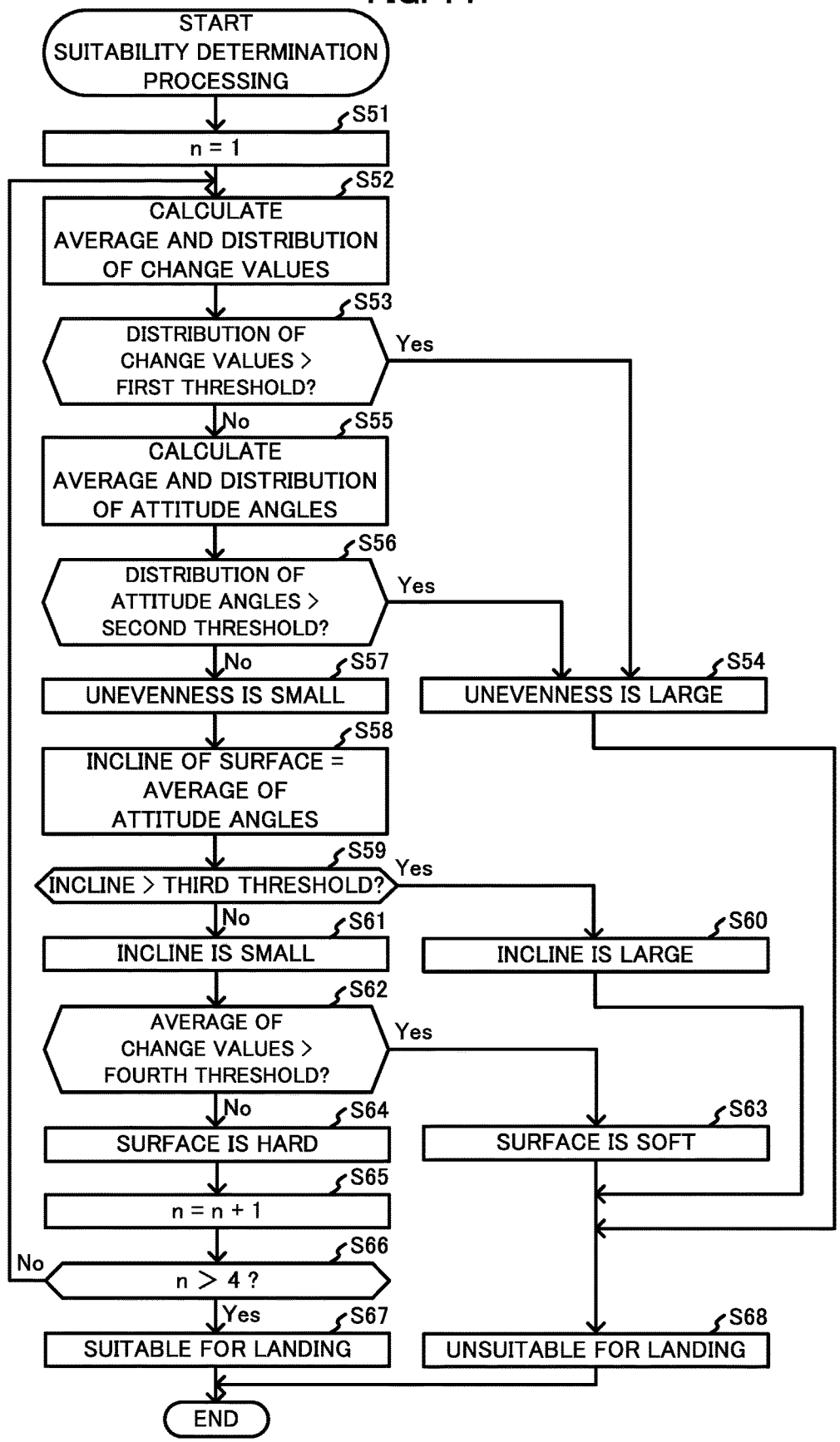
FIG. 14 is a flowchart illustrating an example of suitability determination processing executed by the control device of the delivery system.

Thereafter, the determiner 240 identifies, on the basis of the acquired plurality of state information, changes in the patterns drawn on the surface of the covering 110 that are caused by the traveling of the ground vehicle 300. Next, the determiner 240 executes suitability determination processing such as illustrated in FIG. 14 in which a determination is made, on the basis of the identified changes in the patterns and the attitude of the ground vehicle 300 expressed in the plurality of state information, whether or not the characteristics of the surface of the target area covered by the covering 110 are suitable for the landing of the delivery aircraft 500 (step S36).

When the suitability determination processing starts, the determiner 240 initializes a variable n that represents the number of the travel route to "1" (step S51). The determiner 240 initializes the value of the variable n to "1" in order to execute the following processing in order from the first route.

Next, the determiner 240 performs template matching, for example, to identify, from the plurality of images expressed in the acquired plurality of state information, an image region expressing a first route that is a route having the number of the travel route "1" and an image region expressing the ground vehicle 300. Next, the determiner 240 identifies a plurality of images in which the identified image region expressing the first route and the image region expressing the ground vehicle 300 are overlapped or continuous, and identifies the identified plurality of images as images obtained by imaging the ground vehicle 300 that is traveling on the first route.

Figure 15:
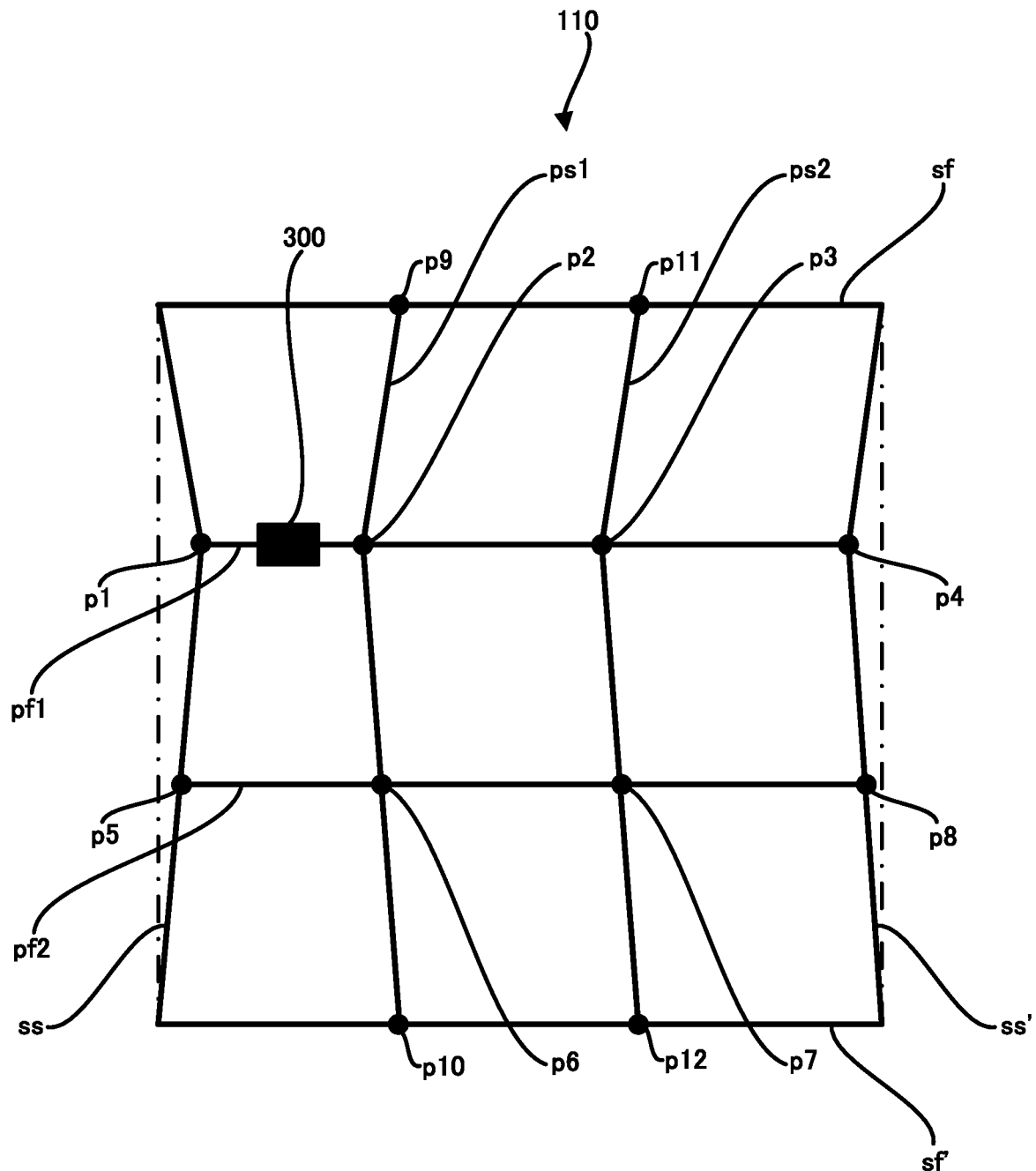
FIG. 15 is a drawing illustrating an example of a change in pattern of the covering.

Thereafter, the determiner 240 targets one of the plurality of images identified as being images obtained by imaging the ground vehicle 300 that is traveling on the first route. Next, the determiner 240 determines whether or not the ground vehicle 300 is positioned between the point p1 and the point p2 in the targeted image as illustrated in FIG. 15, and, when the determiner 240 determines that the ground vehicle 300 is positioned between the point p1 and the point p2, the determiner 240 calculates the distance in that image between the point p1 and the point p2 in that image. Thereafter, the determiner 240 sets the calculated distance as a distance 1' between the point p1 and the point p2 that has been changed by the ground vehicle 300.

Figure 16A:
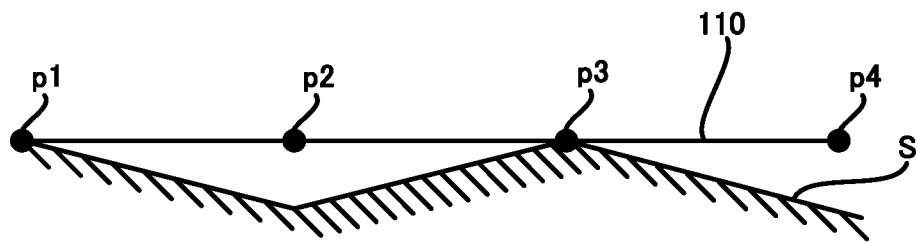
FIG. 16A is a drawing illustrating an example of the relationship between the covering and a surface covered by the covering.

Changes in the distance in the image due to the ground vehicle 300 occurs in cases in which, for example, as illustrated in FIG. 16A, there is an unevenness in a portion of the surface S of the target area, and the portion from the point p 1 to the point p2 and the portion from the point p2 to the point p3 of the covering 110 are not in close contact with the surface S. In such a case, when the ground vehicle 300 travels on the covering 110 to a middle position between the point p1 and the point p2, the portion of the covering 110 that is not in close contact with the surface S will, due to the weight of the ground vehicle 300, be brought into close contact with the surface S that has the unevenness. As such, in an image obtained by imaging the covering 110 from the vertical direction, the point p1 and the point p2 of the covering 110 will be at positions closer to each other than before the portion of the covering 110 from the point p 1 to the point p2 is brought into close contact with the unevennesses of the surface S and, as a result, the distance in the image between the point p1 and the point p2 will be changed and made shorter by the ground vehicle 300.

Thereafter, in order to calculate the distance 1 between the point p 1 and the point p2 before being changed by the ground vehicle 300, the determiner 240 reads information stored in advance in the information storage 290. This information expresses a focal length f of a non-illustrated lens of the imaging device 452 of the transport aircraft 400 illustrated in FIG. 8. Additionally, the determiner 240 reads the information expressing the altitude H that is the minimum value of the flight altitude of the transport aircraft 400 at which the entire covering 110 is included in the angle of view of the imaging device 452, and the information expressing the distance r/3 from the point p1 to the point p2 of the covering 110.

Thereafter, the determiner 240 calculates the distance between the point p1 and the point p2 in the image obtained by imaging using the imaging device 452, which has an optical axis directed vertically downward, of the transport aircraft 400 for a case in which the covering 110 is spread out horizontally. This calculation is carried out on the basis of the focal length f of the imaging device 452, the altitude H that is the distance from the imaging device 452 to the covering 110, and the distance r/3 between the point p1 and the point p2 of the covering 110 that are expressed in the read information. Next, the determiner 240 sets the calculated distance as a distance 1 between the point p1 and the point p2 before being changed by the ground vehicle 300.

Thereafter, the determiner 240 subtracts, from a value of "1", a value obtained by dividing the changed distance 1' between the point p1 and the point p2 by the unchanged distance 1 between the point p1 and the point p2, to calculate a change value that represents the change in the grid-like pattern at the imaging date and time of the targeted image. In images obtained by imaging when the ground vehicle 300 travels at points where depressions in the surface S are deeper, the point p1 and the point p2 of the covering 110 that is brought into close contact with the depressed surface S will be positioned closer to each other. As such, change values calculated from such images will be closer to the value of "1". In contrast, change values calculated from images obtained by imaging when the ground vehicle 300 travels at points where depressions in the surface S are shallower will be closer to the value of "0". Note that, since the depression in the surface S is formed as a valley between two bulges, change values calculated from images obtained by imaging when the ground vehicle 300 travels on lower points of the bulge of the surface S will be closer to the value of "1", and change values calculated from images obtained by imaging when the ground vehicle 300 travels on higher points of the bulge of the surface S will be closer to the value of "0".

When the determiner 240 determines that the ground vehicle 300 is not positioned between the point p1 and the point p2, the determiner 240 further determines whether or not the ground vehicle 300 is positioned between the point p2 and the point p3 in the targeted image. When the determiner 240 determines that the ground vehicle 300 is positioned between the point p2 and the point p3, the determiner 240 calculates the unchanged distance 1 and the changed distance 1' between the point p2 and the point p3.

When the determiner 240 determines that the ground vehicle 300 is not positioned between the point p2 and the point p3, the determiner 240 determines that the ground vehicle 300 is positioned between the point p3 and the point p4 and calculates the unchanged distance 1 and the changed distance 1' between the point p3 and the point p4. Thereafter, the determiner 240 repeats the calculation of the change values of the patterns until there are no untargeted images left.

Next, the determiner 240 calculates the change values of the patterns from all of the images in which the ground vehicle 300 is traveling on the first route and, then, calculates an average and a distribution of the calculated plurality of change values (step S52 of FIG. 14).

Next, the determiner 240 determines whether or not the distribution of the change values of the patterns is greater than a predetermined first threshold (step S53). At this time, when the determiner 240 determines that the distribution of the change values of the patterns is greater than the first threshold (step S53; Yes), the determiner 240 identifies that the unevenness of the surface of the target area is too large for the delivery aircraft 500 to safely land at the target area (step S54).

Figure 16B:
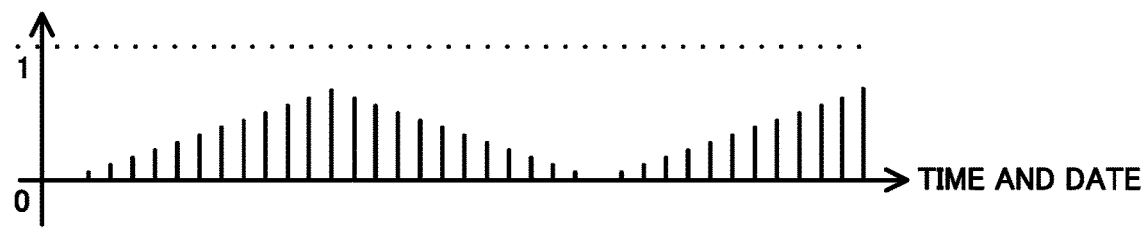
FIG. 16B is a drawing illustrating an example of a change value that represents the change that occurs in the pattern of the covering.

The reason the determiner 240 makes such an identification is because, for example, as illustrated in FIG. 16B, the change values of the patterns, calculated from images obtained by imaging when the ground vehicle 300 travels at points where depressions in the surface S of the target area are deeper, are larger; and the change value of the patterns, calculated from images obtained by imaging when the ground vehicle 300 travels at points where the depressions in the surface S are shallower, are smaller. That is, the reason for this identification is because, when the distribution of the change values of the patterns is greater than the predetermined first threshold, one or a plurality of the unevennesses of the surface S of the target area can be identified as being larger than a predetermined size.

In step S53 of FIG. 14, when the determiner 240 determines that the distribution of the change values of the patterns is less than or equal to the first threshold (step S53; No), the determiner 240 identifies, on the basis of the imaging date and times of the plurality of images identified as images obtained by imaging the ground vehicle 300 traveling on the first route, the period in which the ground vehicle 300 traveled on the first route. Next, the determiner 240 identifies a plurality of state information expressing the attitude angle of the ground vehicle 300 acquired together with the date and time information expressing the date and times included in the identified period. Thereafter, the determiner 240 calculates the average and the distribution of the attitude angles of the ground vehicle 300 expressed in the identified plurality of state information (step S55).

Next, the determiner 240 determines whether or not the distribution of the attitude angles of the ground vehicle 300 is greater than a predetermined second threshold (step S56). At this time, when the determiner 240 determines that the distribution of the attitude angles is greater than the second threshold (step S56; Yes), the determiner 240 identifies that the unevenness of the surface of the target area is too large (step S54).

Figure 16C:
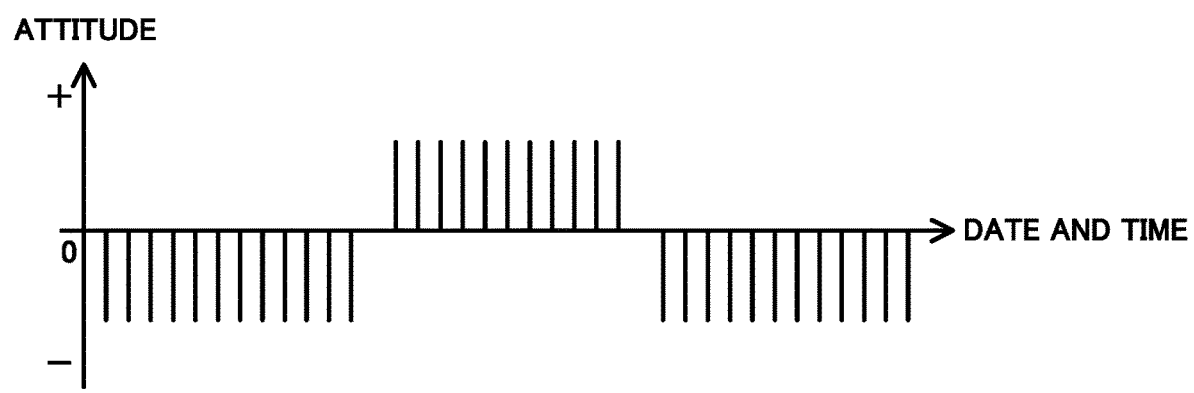
FIG. 16C is a drawing illustrating an example of the attitude of the ground vehicle that travels on the covering.

The reason the determiner 240 makes such an identification is because the attitude angle of the ground vehicle 300 is the minimum angle formed between the advancing direction of the ground vehicle 300 and the horizontal plane. That is, such an identification is made because, as illustrated in FIG. 16C for example, the mark of the attitude angle detected when the ground vehicle 300 enters a depression in the surface S becomes negative and the mark of the attitude angle detected when the ground vehicle 300 departs from the depression becomes positive. Thus, the mark of the attitude angle differs when the ground vehicle 300 enters and departs from depressions in the surface S. Likewise, the mark of the attitude angle detected when the ground vehicle 300 descends from a bulge of the surface S becomes negative, and the mark of the attitude angle detected with the ground vehicle 300 ascends the bulge becomes positive. Moreover, such an identification is made because the size of the detected angle increases as the incline of the depression or the bulge of the surface S increases, and decreases as the incline decreases. That is, such an identification is made because, when the distribution of the attitude angles expressing the advancing direction is greater than the predetermined second threshold, one or a plurality of the unevennesses of the surface S of the target area can be identified as being larger than a predetermined size.

In step S56, when the determiner 240 determines that the distribution of the attitude angles expressing the advancing direction of the ground vehicle 300 is less than or equal to the second threshold (step S56; No), the determiner 240 identifies that the one or plurality of unevennesses of the surface S of the target area are small enough that the delivery aircraft 500 is safely landable at the target area, or that there are no unevennesses (step S57).

Next, the determiner 240 identifies the average value of the attitude angles expressing the advancing direction of the ground vehicle 300 as an angle expressing the incline of the surface of the target area (step S58).

Thereafter, the determiner 240 determines whether or not the angle expressing the incline of the surface is greater than a predetermined third threshold (step S59). At this time, when the determiner 240 determines that the angle expressing the incline is greater than the third threshold (step S59; Yes), the determiner 240 identifies that the incline of the surface of the target area is too great for the delivery aircraft 500 to safely land at the target area (step S60). The reason the determiner 240 makes such an identification is because, when the incline of the surface is greater than the third threshold, the possibility of the delivery aircraft 500 toppling over when landing becomes greater than a predetermined possibility.

In step S59, when the determiner 240 determines that the angle expressing the incline of the surface is less than or equal to the third threshold (step S59; No), the determiner 240 identifies that the incline of the target area is small enough that the delivery aircraft 500 is safely landable at the target area, or that there is no incline (step S61).

Thereafter, the determiner 240 determines whether or not the average value of the change values of the patterns is greater than a predetermined fourth threshold (step S62). At this time, when the determiner 240 determines that the average value of the change values of the patterns is greater than the fourth threshold (step S62; Yes), the determiner 240 identifies that the surface of the target area is too soft for the delivery aircraft 500 to safely land at the target area (step S63). The reason the determiner 240 makes such an identification is because, as the surface of the target area becomes softer overall, the change values of the patterns increases as a whole and, as a result, the distribution of the change values of the patterns becomes smaller and the average of the change values of the patterns becomes larger. That is, this identification is made because, when the distribution of the change values of the patterns is less than or equal to the predetermined first threshold and, also, the average of the change values of the patterns is greater than the predetermined fourth threshold, the surface of the target area can be identified as being softer than a predetermined softness. As such, this identification is made because the possibility of the shape of the surface changing due to the weight of the delivery aircraft 500 and the delivery aircraft 500 losing balance, toppling over, or the like when the delivery aircraft 500 lands at the target area or before a predetermined amount of time elapses from the landing can be identified as being higher than a predetermined possibility.

In step S62, when the determiner 240 determines that the average value of the change values of the patterns is less than or equal to the fourth threshold (step S62; No), the determiner 240 identifies that the surface of the target area is hard enough that the delivery aircraft 500 is safely landable at the target area (step S64).

Thereafter, the determiner 240 increases the value of the variable n by a value "1", thereby changing the value of the variable n to a value "2" (step S65) and, then, determines whether or not the value of the variable n is greater than the total number "4" of travel routes (step S66). In this case, the determiner 240 determines that the value "2" of the variable n is less than or equal to the total number "4" of travel routes (step S66; No), and repeats the processing from step S52 for the second route.

Thereafter, when the determiner 240 determines that the value of the variable n is "5" and is greater than the total number "4" of travel routes (step S66; Yes), the determiner 240 determines that the processing has been executed for the four travel routes. Next, the determiner 240 determines that surface of the target area is suitable for the landing of the delivery aircraft 500 (step S67) and, then, ends the execution of the suitability determination processing.

After identifying that the one or plurality of unevennesses of the surface of the target area are too large in step S54, after identifying that the incline of the surface is too great in step S60, or after identifying that the surface is too soft in step S63, the determiner 240 determines that the surface of the target area is not suitable for the landing of the delivery aircraft 500 (step S68). Thereafter, the determiner 240 ends the execution of the suitability determination processing. Note that a person skilled in the art can determine, by experiment, the optimal values for the first to fourth thresholds used in the suitability determination processing.

When the determiner 240 determines, by the suitability determination processing, that the surface of the target area is suitable for the landing of the delivery aircraft 500 (step S37; Yes of FIG. 13), the determiner 240 determines that the delivery aircraft 500 is landable at the target area (step S38), and determines to use that target area as a port (step S39).

Next, the updater 250 updates the use flag associated, in the port table of FIG. 7, with the information expressing the latitude and the information expressing the longitude of the target area included in the arrival report acquired in step S31, to a use flag expressing that the target area is to be used as a port (step S40).

Thereafter, the notifier 260 generates a use start notification notifying that the use of the target area as a port is to be started, and outputs the generated use start notification to the data communication circuit 204a of FIG. 4 with the mobile terminal 190 as the destination (step S41). When the data communication circuit 194a of the mobile terminal 190 illustrated in FIG. 3 receives the use start notification, the CPU 191 of the mobile terminal 190 controls the display device 195b to display the use start notification.

When the determiner 240 determines, by the suitability determination processing, that the surface of the target area is not suitable for the landing of the delivery aircraft 500 (step S37; No), the determiner 240 determines that the delivery aircraft 500 is unlandable at the target area (step S42), and determines to not use the target area as a port (step S43).

Thereafter, the updater 250 does not update the port table of FIG. 7, and the notifier 260 generates a non-use notification notifying that the target area is not to be used as a port and notifying of the reason for the determination of unsuitability as a port made in step S54, S60, or S63 of FIG. 14. Next, the notifier 260 outputs the generated non-use notification to the data communication circuit 204a of FIG. 4 with the mobile terminal 190 as the destination (step S44). When the data communication circuit 194a of the mobile terminal 190 receives the non-use notification, the CPU 191 of the mobile terminal 190 controls the display device 195b to display the non-use notification and a message requesting improvement of the target area.

After the execution of step S41 or S44, the ground vehicle controller 230 of the control device 200 outputs, to the data communication circuit 204a with the transport aircraft 400 as the destination, a travel stop command commanding the stopping of the traveling (step S45). Additionally, the aircraft controller 220 outputs, to the data communication circuit 204a with the transport aircraft 400 as the destination, a lift command commanding the lifting of the ground vehicle 300 and a return command commanding the return to the office (steps S46 and S47), and ends the execution of the use determination processing.

When an article is brought into the office of the company that performs delivery of articles in the region that includes the target area determined to be used as a port, a worker working at the office reads a slip affixed to cardboard in which the article is packaged, and confirms the delivery destination of the article. Thereafter, the worker performs an operation for inputting the delivery destination on the input device 205c of the control device 200 illustrated in FIG. 4.

Figure 17:
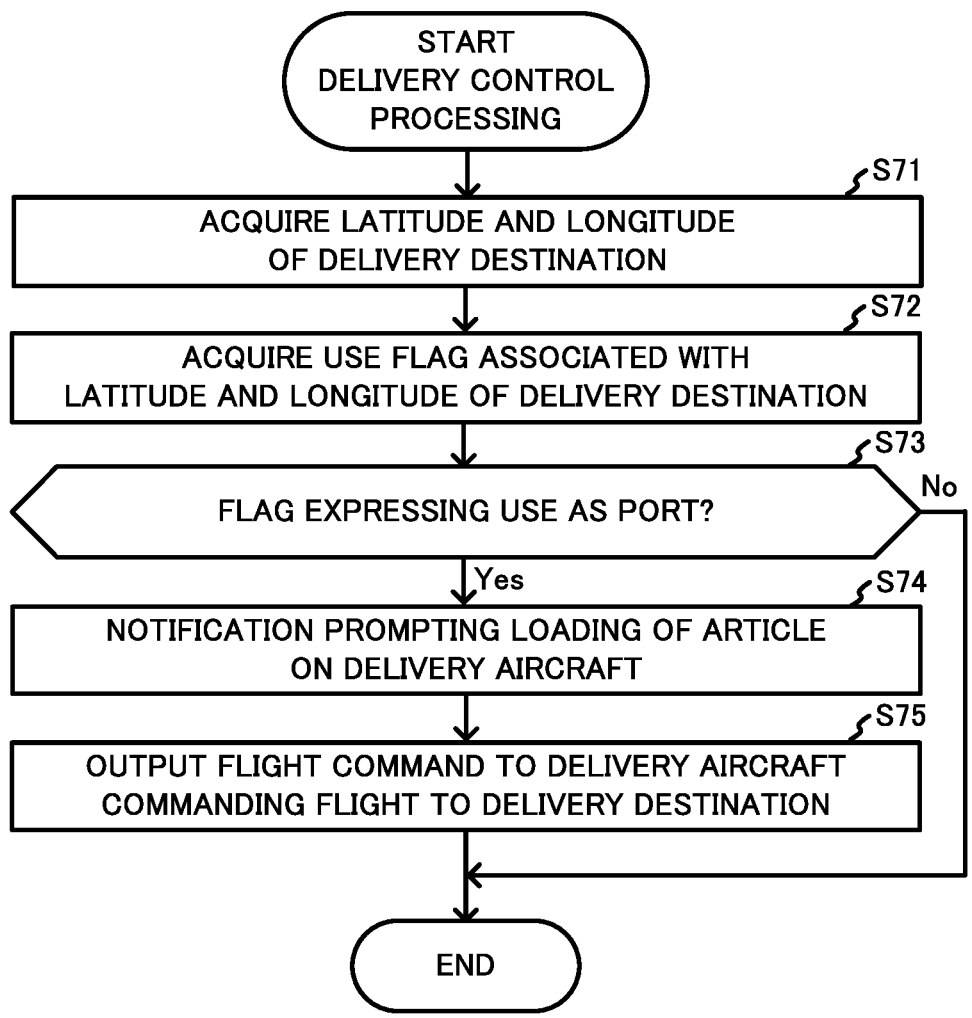
FIG. 17 is a flowchart illustrating an example of delivery control processing executed by the control device of the delivery system.

When the input device 205c of the control device 200 inputs a signal corresponding to the operation of the worker, the CPU 201 of the control device 200 executes delivery control processing such as illustrated in FIG. 17 for causing the delivery aircraft 500 to deliver the article.

When the execution of the delivery control processing starts, the acquirer 210 of the control device 200 acquires, on the basis of the inputted signal, information expressing the address of the delivery destination. Next, the acquirer 210 acquires, from the information storage 290, information expressing the latitude and information expressing the longitude of the address that are associated with the acquired address and stored in advance (step S71).

Next, the determiner 240 acquires, from the port table of FIG. 7, the use flag associated with the information expressing the latitude and the information expressing the longitude of the delivery destination (step S72), and determines whether or not the acquired use flag is a flag indicating that the target area is to be used as a port (step S73).

At this time, when the determiner 240 determines that the acquired use flag is a flag indicating that the target area is to be used as a port (step S73; Yes), the notifier 260 causes the display device 205b illustrated in FIG. 4 to display a notification prompting for the article to be loaded on the delivery aircraft 500 (step S74).

Thereafter, upon viewing the notification, the worker loads the article on the delivery aircraft 500 and, then, operates the input device 205c of the control device 200. When the input device 205c operated by the worker inputs a signal expressing the end of the loading of the article on the delivery aircraft 500, the aircraft controller 220 generates a flight command that includes the information expressing the latitude and the information expressing the longitude of the delivery destination, and that commands flying to the delivery destination. Thereafter, the aircraft controller 220 outputs the generated flight command to the data communication circuit 204a with the delivery aircraft 500 as the destination (step S75) and, then, ends the execution of the delivery control processing.

In step S73, when the determiner 240 is unable to acquire the use flag from the port table of FIG. 7, or when the determiner 240 determines that the acquired use flag is a flag indicating that the target area is not to be used as a port (step S73; No), the determiner 240 determines not to deliver the article using the delivery aircraft 500. Thereafter, the notifier 260 causes the display device 205b to display a message prompting the worker to deliver the article by, for example, automobile, motorcycle, bicycle, walking, or the like and, then, ends the execution of the delivery control processing.

Figure 18:
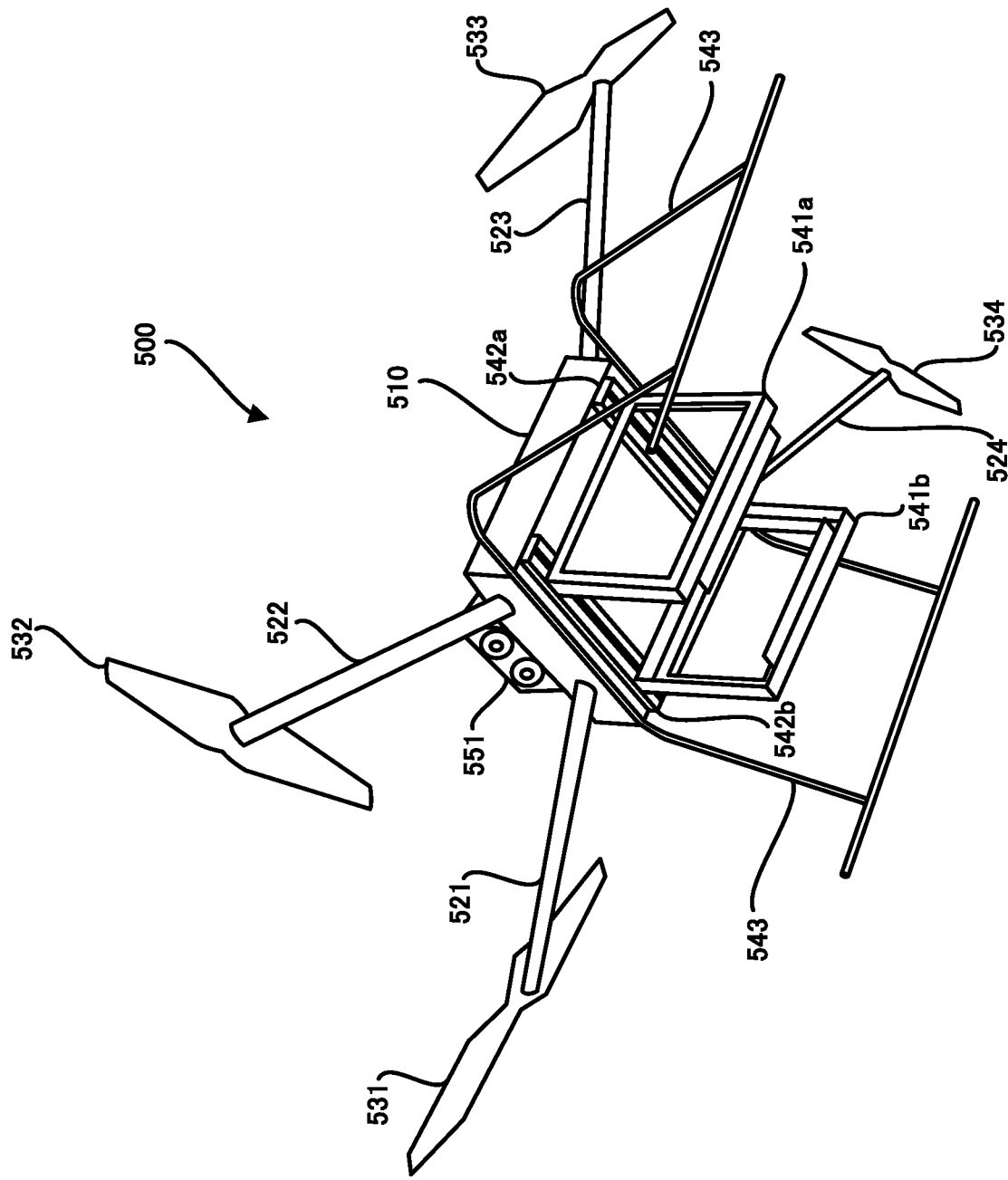
FIG. 18 is an appearance configuration drawing illustrating an example of the appearance of a delivery aircraft.

The delivery aircraft 500 is an unmanned aircraft such as illustrated in FIG. 18. The delivery aircraft 500 includes a control device 510, propeller arms 521 to 524, propellers 531 to 534, non-illustrated motors that rotate the propellers 531 to 534, and an imaging device 551. The configurations and functions of the control device 510, the propeller arms 521 to 524, the propellers 531 to 534, the non-illustrated motors, and the imaging device 551 of the delivery aircraft 500 are the same as the configurations and functions of the control device 410, the propeller arms 421 to 424, the propellers 431 to 434, the non-illustrated motors, and the imaging device 451 of the transport aircraft 400.

The delivery aircraft 500 includes, beneath the control device 510, a first holding frame 541a that surrounds and holds four sides of one side face (hereinafter referred to as "first surrounded face") of the parallelepiped shaped cardboard in which the article is packaged, and a second holding frame 541b that surrounds and holds four sides of a side face (hereinafter referred to as "second surrounded face") opposite the first surrounded face. Furthermore, the delivery aircraft 500 includes, on a bottom surface of the control device 510, guide rails 542a and 542b that extend in a normal direction of the first surrounded face and the second surrounded face of the article, suspend the first holding frame 541a and the second holding frame 541b, and have the movement direction of the first holding frame 541a and the second holding frame 541b as the extending direction.

Furthermore, the delivery aircraft 500 includes a non-illustrated motor that causes the first holding frame 541a and the second holding frame 541b to surround and hold the article by moving, in accordance with the control of the control device 510, the first holding frame 541a and the second holding frame 541b in directions so as to approach each other. This non-illustrated motor causes the first holding frame 541a and the second holding frame 541b to release the surrounded and held article by moving, in accordance with the control of the control device 510, the first holding frame 541a and the second holding frame 541b in directions so as to separate from each other.

Furthermore, the delivery aircraft 500 includes a support leg 543 that protrudes downward from the bottom surface of the control device 510 and that supports the control device 510. The length in the vertical direction of the support leg 543 is designed to be longer, by a predetermined length, than the lengths in the vertical direction of the first holding frame 541a and the second holding frame 541b.

The control device 510 of the delivery aircraft 500 includes a CPU, a RAM, a ROM, a flash memory, a data communication circuit, a GPS circuit, an input/output port, and a drive circuit that are non-illustrated. The configurations and the functions of the non-illustrated CPU, RAM, ROM, flash memory, data communication circuit, GPS circuit, and input/output port of the delivery aircraft 500 are the same as the configurations and the functions of the CPU 411, the RAM 412, the ROM 413a, the flash memory 413b, the first data communication circuit 414a, the GPS circuit 416, and input/output port 418 of the transport aircraft 400 illustrated in FIG. 10.

The non-illustrated drive circuit of the delivery aircraft 500 is connected to non-illustrated cables that are connected to each of the non-illustrated motors that rotate the propellers 531 to 534, and a cable that is connected to the non-illustrated motor that moves the first holding frame 541a and the second holding frame 541b. The drive circuit drives, in accordance with the signals output by the non-illustrated CPU, the non-illustrated motors that rotate the propellers 531 to 534 or the non-illustrated motor that moves the first holding frame 541a and the second holding frame 541b.

Figure 19:
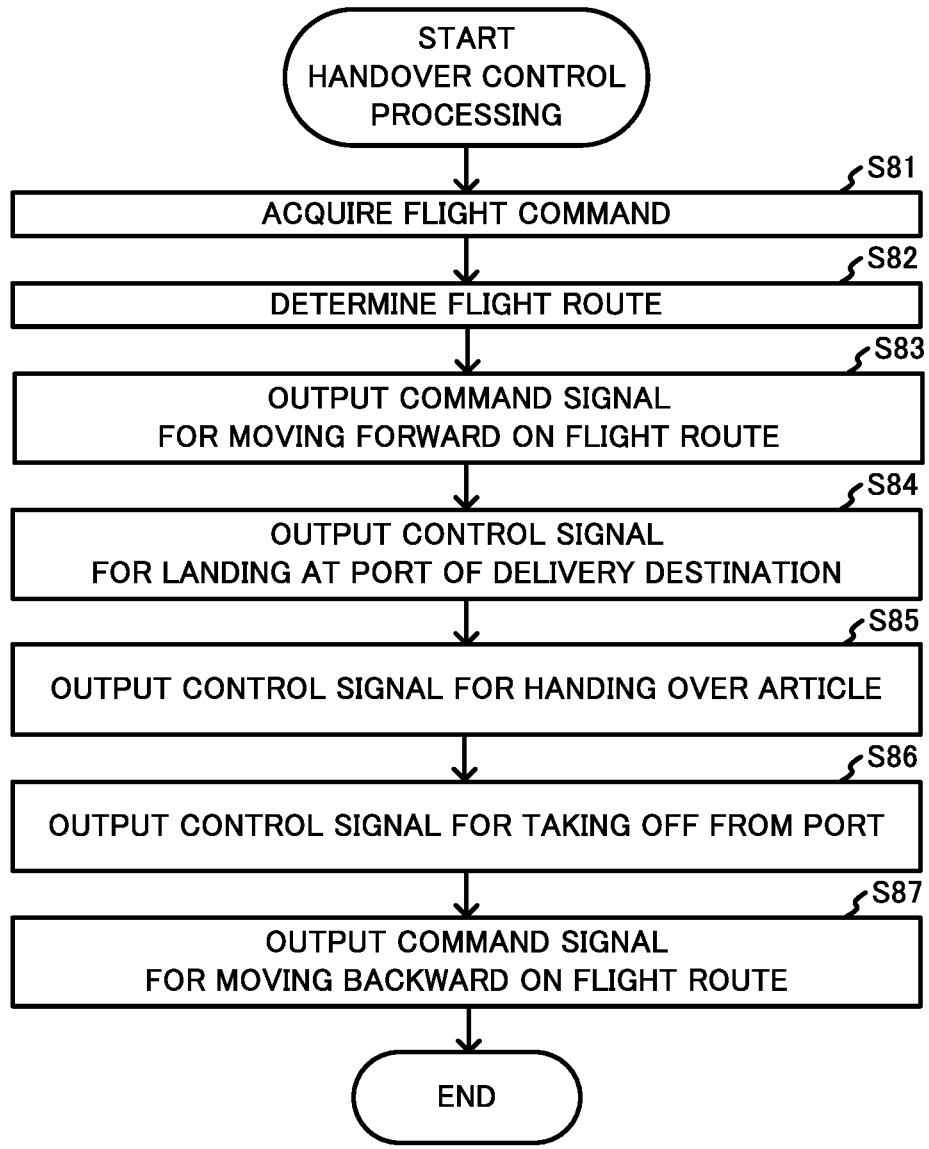
FIG. 19 is a flowchart illustrating an example of handover control processing executed by the delivery aircraft.

When the non-illustrated data communication circuit of the delivery aircraft 500 receives the flight command sent from the control device 200, the non-illustrated CPU of the delivery aircraft 500 executes handover control processing such as illustrated in FIG. 19 for controlling the non-illustrated motors and the like to fly to the delivery destination in accordance with the flight command and hand over the article at the delivery destination.

When the execution of the handover control processing starts, the CPU of the delivery aircraft 500 executes the same processing as steps S11 to S13 of FIG. 11 and, as a result, the delivery aircraft 500 flies in accordance with the flight command to the delivery destination (steps S81 to S83).

Next, the CPU of the delivery aircraft 500 generates a control signal that controls the propellers 531 to 534 so as to cause the delivery aircraft 500 to land at the target area, and outputs the generated signal to the drive circuit (step S84). Then, the CPU generates a control signal that causes the first holding frame 541a and the second holding frame 541b to move apart from each other and outputs the generated signal to the drive circuit, thereby causing the first holding frame 541a and the second holding frame 541b to release the article. Thus, the delivery aircraft 500 hands over the article to a person at the delivery destination, for example (step S85).

Next, the CPU of the delivery aircraft 500 generates a control signal that controls the propellers 531 to 534 so as to cause the delivery aircraft 500 to take off from the target area, and outputs the generated signal to the drive circuit (step S86). Thereafter, the CPU causes the delivery aircraft 500 to fly on the flight route back to the office by executing the same processing as step S24 of FIG. 11 (step S87) and, then, ends the execution of the handover control processing.

According to these configurations, the control device 200 includes the determiner 240 that determines, on the basis of the state information expressing the state of the surface of the target area, whether or not the delivery aircraft 500 is landable at the target area. As such, even if, for example, a worker does not go to the target area to confirm the state of the surface of the target area, the control device 200 can determine whether or not the delivery aircraft 500 is landable at the target area.

The control device 200 also includes the ground vehicle controller 230 that causes the ground vehicle 300 to travel at the target area, the acquirer 210 that acquires the state information expressing the state of the surface of the target area while the ground vehicle 300 travels the target area, and the determiner 240 that determines, on the basis of the acquired state information, whether or not the delivery aircraft 500 is landable at the target area. As such, for example, even in a case in which the state of the surface of the target area changes due to the weight of the delivery aircraft 500 being applied to the surface at the time of landing or immediately after landing, for example, a determination can be made, on the basis of the state information expressing the state of the surface changed due to the weight of the ground vehicle 300, as to whether or not the delivery aircraft 500 is landable at the target area, before the delivery aircraft 500 lands at the target area.

Furthermore, the surface of the target area is covered by the covering 110. The control device 200 further includes the acquirer 210 that acquires, as the state information, images obtained by the imaging device 452 imaging the covering 110 while the ground vehicle 300 travels on the covering 110. Furthermore, the determiner 240 of the control device 200 determines, on the basis of changes of the covering 110 identified on the basis of the acquired state information, whether or not the delivery aircraft 500 is landable at the target area that is covered by the covering 110. As such, since the surface of the target area is covered by the covering 110, even in a case in which the state of the surface cannot be directly observed, the control device 200 can acquire the state information expressing the state of the surface on the basis of the images obtained by imaging the covering 110 that is brought into close contact with the surface of the target area due to the weight of the ground vehicle 300.

Furthermore, the covering 110 includes the predetermined patterns ps1, ps2, pf1, and pf2, and the determiner 240 of the control device 200 determines, on the basis of changes of the patterns of the covering 110 identified on the basis of the acquired state information, whether or not the delivery aircraft 500 is landable at the target area that is covered by the covering 110. When the covering 110 that is not brought into close contact with the surface of the target area is brought into close contact with the surface of the target area due to the weight of the ground vehicle 300, the spacing of the patterns ps1, ps2, pf1, and pf1 drawn on the covering 110 change in the images obtained by imaging the covering 110. Thus, the control device 200 can more accurately observe the state of the surface on the basis of the changes in the images of the patterns ps1, ps2, pf1, and pf1 drawn on the covering 110 and, as such, can more accurately determine whether or not the delivery aircraft 500 is landable at the target area.

Furthermore, the determiner 240 of the control device 200 identifies, on the basis of the changes of the patterns ps1, ps2, pf1, and pf2 of the covering 110, the characteristics of the surface of the target area that is covered by the covering 110, and determines, on the basis of the identified characteristics, whether or not the delivery aircraft 500 is landable at the target area. Therefore, the determiner 240 of the control device 200 can more accurately determine whether or not the delivery aircraft 500 is safely landable at the target area.

Furthermore, the characteristics of the surface of the target area includes any one or more of the size of the unevenness of the surface, the size of the incline of the surface, and the softness of the surface. As such, the determiner 240 of the control device 200 identifies, on the basis of the changes of the patterns ps1, ps2, pf1, and pf2 of the covering 110, any one or more of the size of the unevenness, the size of the incline, and the softness of the surface of the target area that is covered by the covering 110. Additionally, the determiner 240 determines, on the basis of any one or more of the size of the unevenness, the size of the incline, and the softness, whether or not the delivery aircraft 500 is landable at the target area. As the unevenness of the surface increases, the possibility of the delivery aircraft 500 not being safely landable, due to the delivery aircraft 500 losing balance when landing on that surface and toppling over, increases. Likewise, as the incline of the surface increases, or as the softness of the surface increases, the possibility of the delivery aircraft 500 not being safely landable increases. As such, the control device 200 can more accurately determine, on the basis of any one or more of the identified size of the unevenness, the size of the incline, and the softness of the surface of the target area, whether or not the delivery aircraft 500 is safely landable at the target area.

The transport aircraft 400 that transports the ground vehicle 300 is an aircraft different from the delivery aircraft 500, and is physically connected to the ground vehicle 300. The control device 200 further includes the aircraft controller 220 that causes the transport aircraft 400 to lower the ground vehicle 300 to the target area while the transport aircraft 400 is flying above the target area. Additionally, the ground vehicle controller 230 of the control device 200 causes the ground vehicle 300 to travel at the target area after the ground vehicle 300 is lowered to the target area, while the transport aircraft 400 is flying. Furthermore, after the ground vehicle 300 has traveled the target area, the aircraft controller 220 causes the transport aircraft 400 to lift the ground vehicle 300 from the target area while the transport aircraft 400 is flying. According to these configurations, even in a case in which, for example, the surface of the target area is unsuitable for landing and taking off by the transport aircraft 400, the control device 200 can lower the ground vehicle 300 to the target area, cause the ground vehicle 300 to travel, and reliably lift the ground vehicle 300 from the target area.

The transport aircraft 400 includes the imaging device 452 that images the covering 110, and the acquirer 210 of the control device 200 acquires, from the transport aircraft 400 that transports the ground vehicle 300, information expressing an image obtained by imaging while the ground vehicle 300 travels on the covering 110, as the state information. In a case in which the surface of the transport aircraft 400 is covered by the covering 110 and, also, the covering 110 is not in close contact with the entire surface of the target area, it is difficult to acquire the state information expressing the state of the surface of the target area by only imaging the target area with the imaging device 452 while the transport aircraft 400 hovers or circles above the target area. The reason it is difficult to acquire the state information is because the state of the surface of the covering 110 does not necessarily match the state of the surface of the target area. As such, when the imaging device 452 images the covering 110 while the ground vehicle 300 travels on the covering 110, it is possible to generate images expressing the surface of the covering 110 brought into close contact with the surface of the target area due to the weight of the ground vehicle 300 and, as a result, the information expressed in those images can be acquired as the state information expressing the state of the surface of the target area.

The ground vehicle 300 includes a detector 387 that detects the attitude of the ground vehicle 300 while the ground vehicle 300 travels the target area. The acquirer 210 of the control device 200 acquires the information expressing the detected attitude as the state information expressing the state of the surface. As such, it is possible to acquire the state information expressing the state of the surface even if the surface of the target area is covered by the covering 110.

Modified Example 1 of Embodiment

In the present embodiment, it is described that the determiner 240 of the control device 200 identifies the size of the unevenness of the surface of the target area in steps S54 and S57 of FIG. 14, identifies the size of the incline of the surface in steps S60 and S61, and identifies the softness of the surface in steps S63 and S64. Additionally, it is described that the determiner 240 determines, on the basis of the identified size of the unevenness, the size of the incline, and the softness, whether or not the delivery aircraft 500 is landable at the target area.

However, the present embodiment is not limited thereto, and a configuration is possible in which the determiner 240 identifies any one of the size of the unevenness, the size of the incline, and the softness of the surface of the target area and, also, determines, on the basis of any one of the identified size of the unevenness, the size of the incline, and the softness, whether or not the delivery aircraft 500 is landable at the target area.

Moreover, the present embodiment is not limited thereto, and a configuration is possible in which the determiner 240 identifies and two of the size of the unevenness, the size of the incline, and the softness of the surface of the target area and, also, determines, on the basis of any two of the identified size of the unevenness, the size of the incline, and the softness, whether or not the delivery aircraft 500 is landable at the target area.

Modified Example 2 of Embodiment

In the present embodiment, it is described that the determiner 240 of the control device 200 determines, on the basis of both the state information expressing the attitude angle of the ground vehicle 300 and the state information expressing the image obtained by imaging the covering 110 on which the ground vehicle 300 is situated, whether or not the delivery aircraft 500 is landable at the target area.

However, the present embodiment is not limited thereto, and a configuration is possible in which the determiner 240 of the control device 200 determines, on the basis of the state information expressing the image obtained by imaging the covering 110 on which the ground vehicle 300 is situated, whether or not the delivery aircraft 500 is landable at the target area.

In this case, the determiner 240 of the control device 200 need not execute steps S55 and S56 of FIG. 14 using the state information expressing the attitude angle after a determination is made in step S53 that the distribution of the change values expressing changes of the covering 110, calculated on the basis of the state information expressing in the image, is less than or equal to the first threshold (step S53; No).

Additionally, after the determiner 240 determines that the distribution of the change values is less than or equal to the first threshold (step S53; No), instead of step S58, process for calculating an angle θ, which represents the incline of the surface of the target area, using the unchanged distance 1 and the changed distance 1' is executed.

In the following, for ease of description, an example of a case is described in which the value of the variable n representing the travel route is "1", but the value of the variable n is not limited thereto and may be "2" or "4".

Figure 20:
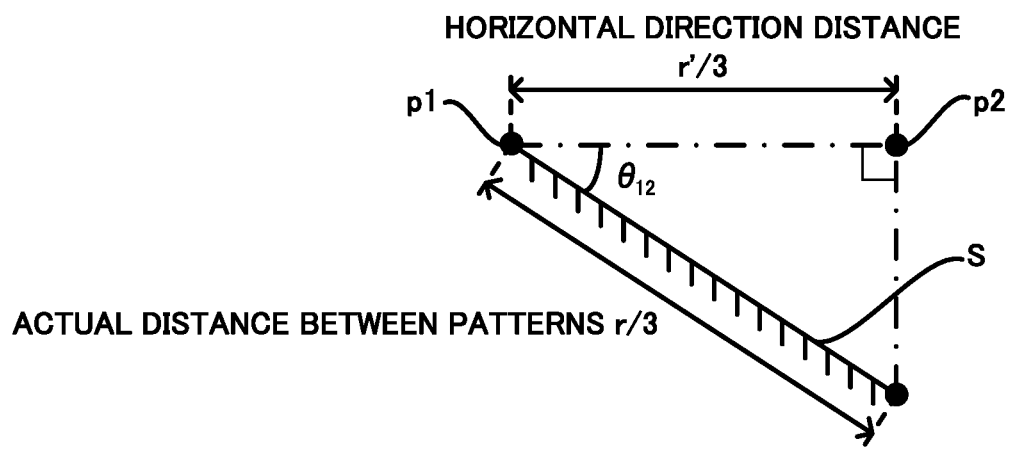
FIG. 20 is a drawing illustrating an example of the relationship between the actual distance and a horizontal direction distance between the patterns of the covering.

As illustrated in FIG. 20, in a case in which, the covering 110 is brought into close contact with the surface S of the target area due to the weight of the ground vehicle 300 at the portion from the point p1 to the point p2 included in the first route, the angle $\theta_{12}$ that represents the incline of the surface S is expressed as Arccos(r'/r). Here, Arccos is an inverse cosine function, and r'/r is the ratio of the horizontal direction distance r'/3 between the point p1 and the point p2 to the actual distance r/3 between the point p1 and the point p2.

Here, r'/r that is the ratio of the horizontal direction distance r'/3 to the actual distance r/3 between the point p1 and the point p2 is equal to the ratio of the changed distance 1' between the point p1 and the point p2 to the unchanged distance 1 between the point p1 and the point p2. This is because, for a case in which the covering 110 is spread out horizontally, the unchanged distance 1 between the point p1 and the point p2 is the distance between the point p1 and the point p2 in an image obtained by imaging the covering 110 using the imaging device 452 of the transport aircraft 400 which has an optical axis directed vertically downward. This is also because, the changed distance 1' between the point p1 and the point p2 is the distance between the point p1 and the point p2 in the image obtained by imaging the covering 110 using the imaging device 452 when the portion from the point p1 to the point p2 of the covering 110 is brought into close contact with the surface S due to the ground vehicle 300.

As such, the determiner 240 sets a value of Arccos (171), calculated using the unchanged distance 1 and the changed distance 1' between the point p1 and the point p2, as the angle $\theta_{12}$ that represents the incline of the surface S. Likewise, the determiner 240 calculates, on the basis of the unchanged distance 1 and the changed distance 1' between the point p2 and the point p3, an angle $\theta_{23}$ that represents the incline, and calculates, on the basis of the unchanged distance 1 and the changed distance 1' between the point p3 and the point p4, an angle $\theta_{34}$ that represents the incline. Thereafter, the determiner 240 calculates an average angle of the calculated angle $\theta_{12}$, angle $\theta_{23}$, and angle $\theta_{34}$, and sets the calculated average angle as the angle that represents the incline of the surface S in the first route. Thereafter, the determiner 240 may execute the processing of step S59 of FIG. 14 to determine whether or not the angle that represents the incline of the surface S in the first route is greater than the third threshold.

The present embodiment is not limited thereto, and a configuration is possible in which the determiner 240 of the control device 200 determines, on the basis of the state information expressing the attitude angle of the ground vehicle 300, whether or not the delivery aircraft 500 is landable at the target area.

In this case, the determiner 240 of the control device 200 need not execute steps S52 and S53 of FIG. 14 that use the state information expressing the image.

Instead of the processing of step S62, the determiner 240 of the control device 200 calculates the difference between the attitude angle of the ground vehicle 300 before stopping expressed in the state information and the attitude angle after the ground vehicle 300 has stopped for a predetermined amount of time. The determiner 240 calculates in this manner because, in a case in which the surface of the target area is soft, the shape of the surface changes with the passage of time due to the weight of the ground vehicle 300 and, as such, a difference occurs between the attitude angle of the ground vehicle 300 before stopping and the attitude angle after the ground vehicle 300 has stopped for a predetermined amount of time.

Thereafter, when the determiner 240 of the control device 200 determines that the calculated difference between the attitude angles is greater than or equal to a predetermined threshold, the determiner 240 may determine that the surface of the target area is too soft for the delivery aircraft 500 to safely land at the target area (step S63). In contrast, when the determiner 240 determines that the calculated difference between the attitude angles is less than the threshold, the determiner 240 may identify that the surface of the target area is hard enough that the delivery aircraft 500 is safely landable at the target (step S64). Note that a person skilled in the art can determine, by experiment, the optimal values for the predetermined amount of time and the predetermined threshold.

Modified Example 3 of Embodiment

In the present embodiment, it is described that the determiner 240 of the control device 200 determines whether or not the delivery aircraft 500 is landable at the target area, but the present embodiment is not limited thereto and a configuration is possible in which the determiner 240 of the control device 200 determines whether or not the transport aircraft 400 is landable at the target area. In this case, the determiner 240 may, in steps S53, S56, S59, and S62 of FIG. 14, use the first threshold and the second threshold, the third threshold, and the fourth threshold for determining whether or not the unevenness of the surface is too large, whether or not the incline of the surface is too large, and whether or not the surface is too soft for the transport aircraft 400 to land safely.

Additionally, the present embodiment is not limited thereto, and a configuration is possible in which the determiner 240 of the control device 200 determines whether or not both the transport aircraft 400 and the delivery aircraft 500 are landable at the target area. In this case as well, the determiner 240 may, in steps S53, S56, S59, and S62 of FIG. 14, use the first threshold and the second threshold, the third threshold, and the fourth threshold for determining whether or not the unevenness of the surface is too large, whether or not the incline of the surface is too large, and whether or not the surface is too soft for at least one of the transport aircraft 400 and the delivery aircraft 500 to land safely. A person skilled in the art can determine, by experiment, the optimal values for the thresholds used in the present modified example.

Modified Example 4 of Embodiment

In the present embodiment, it is described that the determiner 240 of the control device 200 determines whether or not the delivery aircraft 500 is landable at the target area, but the present embodiment is not limited thereto and a configuration is possible in which the determiner 240 of the control device 200 determines whether or not the delivery aircraft 500 is capable of taking off from the target area.

This is because, with the delivery aircraft 500 such as illustrated in FIG. 18 that obtains lift from the propellers 531 to 534, if the attitude of the delivery aircraft 500 tilts more than a predetermined angle, the delivery aircraft 500 will not be able to obtain sufficient lift and, as a result, the delivery aircraft 500 will topple over or the like when taking off and not be able to take off safely, or will not be able to take off at all.

In this case, the determiner 240 may, in steps S53, S56, S59, and the S62 of FIG. 14, use the first threshold and the second threshold, the third threshold, and the fourth threshold for determining whether or not the unevenness of the surface is too large, whether or not the incline of the surface is too large, and whether or not the surface is too soft for the delivery aircraft 500 to take off safely.

Additionally, the present embodiment is not limited thereto, and a configuration is possible in which the determiner 240 of the control device 200 determines whether the delivery aircraft 500 is landable at and is capable of taking off from the target area, or is unlandable at or is incapable of taking off from the target area. In this case as well, the determiner 240 may, in steps S53, S56, S59, and S62 of FIG. 14, use the first threshold and the second threshold, the third threshold, and the fourth threshold for determining whether or not the unevenness of the surface is too large, whether or not the incline of the surface is too large, and whether or not the surface is too soft for the delivery aircraft 500 to land or take off safely. A person skilled in the art can determine, by experiment, the optimal values for the thresholds used in the present modified example.

Modified Example 5 of Embodiment

In the present embodiment, it is described that the covering 110 is a vinyl sheet. However, the present embodiment is not limited thereto and the covering 110 may, for example, be a cloth made from polyester, nylon, cotton, or silk, or a sheet made from paper or a metal such as aluminum, silver, or the like.

Additionally, in the present embodiment, it is described that the shape of the covering 110 is a square shape having a length r of one side, but the shape of the covering 110 is not limited thereto and a configuration is possible in which the covering 110 has a polygonal shape such as a triangular shape, a rectangular shape, or a pentagonal shape, a round shape, or an elliptical shape.

Additionally, in the present embodiment, it is described that the covering 110 includes a grid-like pattern obtained by combining the linear patterns pf1, pf2, ps1, and ps2, but the present embodiment is not limited thereto. For example, a configuration is possible in which n linear patterns pfk (where k is an integer of 1 or greater and n or less, and n is a positive integer of 1 or greater) that are parallel to the reference first side sf and for which the distance from the reference first side sf of each is r×k/n+1, and/or m linear patterns psj (where j is an integer of 1 or greater and m or less, and m is a positive integer of 1 or greater) that are parallel to the reference second side ss and for which the distance from the reference second side ss of each is r×j/m+1 are drawn on the covering 110.

For example, the covering 110 may have a spiral pattern, or may have n concentric patterns that have the center of an inscribed circle inscribed on the covering 110 as a center and that have diameters of r×k/n (where k is an integer of 1 or greater and n or less, and n is a positive integer of 1 or greater).

Modified Example 6 of Embodiment

In the present embodiment, it is described that the ground vehicle 300 includes a plurality of wheels including wheels 301 and 302, such as illustrated in FIG. 8. However, the ground vehicle 300 is not limited thereto, and a configuration is possible in which the ground vehicle 300 includes two legs that include a plurality of joints, and walks bipedally. Additionally, the ground vehicle 300 may, for example, further include an endless track such as a caterpillar (registered trademark) that surrounds the plurality of wheels. According to these configurations, the ground vehicle 300 can travel the target area even if the unevenness or the incline of the surface of the target area becomes larger or if the surface becomes softer.

Modified Example 7 of Embodiment

In the present embodiment, it is described that the transport aircraft 400 illustrated in FIG. 8 includes the imaging device 452 that images the covering 110, and the acquirer 210 of the control device 200 acquires, from the transport aircraft 400 that transports the ground vehicle 300, information expressing an image obtained by imaging while the ground vehicle 300 travels on the covering 110, as the state information.

However, the present embodiment is not limited thereto and, for example, a configuration is possible in which the delivery system 1 according to the present modified example includes a non-illustrated imaging device arranged at a position, such as on a tripod, where the entire covering 110 is included in the angle of view, and the acquirer 210 of the control device 200 acquires, as the state information, information expressing an image obtained by imaging using the non-illustrated imaging device while the ground vehicle 300 travels on the covering 110.

To realize this, the CPU 201 of the control device 200 according to the present modified example outputs the travel command in step S34 of FIG. 13 and, then, outputs to the data communication circuit 204*a* with the non-illustrated imaging device as the destination an imaging command commanding imaging to be performed. Thereafter, the data communication circuit 204*a* sends the imaging command to the non-illustrated imaging device and, then, receives, from the non-illustrated imaging device, pluralities of image information expressing an image obtained by imaging the covering 110, and date and time information expressing the imaging date and time.

Thereafter, the CPU 201 of the control device 200 executes steps S35 to S44 to acquire the plurality of image information as the state information, and determines, on the basis of the acquired state information, whether or not the delivery aircraft 500 is landable at the target area that is covered by the covering 110. Thereafter, the CPU 201 of the control device 200 outputs the travel stop command in step S45 and, then, outputs an imaging stop command commanding imaging to be stopped to the data communication circuit 204*a* with the non-illustrated imaging device as the destination.

The non-illustrated imaging device includes a CPU, a RAM, a ROM, and a data communication circuit that are non-illustrated and that have the same configurations and functions as the configurations and functions of the CPU 191, the RAM 192, the ROM 193a, and the data communication circuit 194a of the mobile terminal 190 illustrated in FIG. 3. Additionally, the non-illustrated imaging device includes a non-illustrated lens, a non-illustrated imaging element group that generates electronic signals on the basis of light focused by the lens, and a non-illustrated image generation circuit that generates images on the basis of the electronic signals output from the imaging element group.

When the data communication circuit of the non-illustrated imaging device receives an imaging command from the control device 200, the CPU of the non-illustrated imaging device causes the image generation circuit to generate an image, and acquires image information expressing the generated image from the image generation circuit. Next, the CPU acquires, as the imaging date and time at which the image is obtained by imaging, the system date and time managed by the OS, and outputs the acquired image information and the date and time information expressing the imaging date and time to the non-illustrated data communication circuit with the control device 200 as the destination. Thereafter, the data communication circuit sends the image information and the date and time information to the control device 200. Next, the CPU repeats the processing from the process of causing the image generation circuit to generate an image until the data communication circuit receives an imaging stop command from the control device 200.

Modified Example 8 of Embodiment

In the present embodiment, it is described that the imaging device 452 of the transport aircraft 400 illustrated in FIG. 8 acquires a still image by imaging, and the acquirer 210 of the control device 200 acquires, as the state information, information expressing the still image obtained by imaging while the ground vehicle 300 travels on the covering 110. However, the present embodiment is not limited thereto, and a configuration is possible in which the imaging device 452 of the transport aircraft 400 acquires a moving image by imaging, and the acquirer 210 of the control device 200 acquires, as the state information, information expressing a frame that is a still image included in the moving image obtained by imaging while the ground vehicle 300 travels on the covering 110.

Modified Example 9 of Embodiment

In the present embodiment, it is described that each of the transport aircraft 400 and the delivery aircraft 500 is an unmanned aircraft. However, the present embodiment is not limited thereto, and each of the transport aircraft 400 and the delivery aircraft 500 may be an unmanned flying object.

Additionally, the transport aircraft 400 and the delivery aircraft 500 need not be unmanned and, provided that, with the exception of the control by the control device 200, the transport aircraft 400 and the delivery aircraft 500 are autonomous flying objects, a person may ride the transport aircraft 400 or the delivery aircraft 500. Likewise, the ground vehicle 300 need not be unmanned and, provided that, with the exception of the control by the control device 200, the ground vehicle 300 is an autonomous traveling object, a person may ride the ground vehicle 300.

Modified Example 10 of Embodiment

In the present embodiment, it is described that, when the determiner 240 of the control device 200 executes the suitability determination processing illustrated in FIG. 14 and, as a result, determines that the surface of the target area is not suitable for the safe landing of the delivery aircraft 500, the determiner 240 determines that the delivery aircraft 500 is unlandable at the target area.

However, the present embodiment is not limited thereto, and a configuration is possible in which the determiner 240 of the control device 200 determines that the delivery aircraft 500 is unlandable at that target area also in cases in which an obstacle is present above the target area that obstructs the safe landing of the delivery aircraft 500. Examples of such an obstacle include a tree branch and an overhead line such as a power line.

To realize this, the determiner 240 of the control device 200 acquires the plurality of state information in step S35 of FIG. 13 and, then, uses template matching or the like to detect, from the plurality of images expressed in the acquired plurality of state information, image regions expressing obstacles. Next, when the determiner 240 determines that an image region expressing an obstacle is detected from any of the plurality of images, the determiner 240 determines that the delivery aircraft 500 is unlandable at the target area (step S42) without executing steps S36 and S37 related to the suitability determination processing of FIG. 14.

In contrast, when the determiner 240 of the control device 200 determines that an image region expressing an obstacle is not detected from any of the plurality of images, the determiner 240 executes step S36 for performing the suitability determination processing of FIG. 14. Thereafter, when the determiner 240 determines, by the suitability determination processing, that the surface of the target area is suitable for the safe landing of the delivery aircraft 500 (step S37; Yes), the determiner 240 determines that the delivery aircraft 500 is landable at the target area (step S38). In contrast, when the determiner 240 determines, by the suitability determination processing, that the surface of the target area is not suitable for landing (step S37; No), the determiner 240 determines that the delivery aircraft 500 is unlandable at the target area (step S42).

However, the present embodiment is not limited thereto, and a configuration is possible in which the determiner 240 of the control device 200 also determines that the delivery aircraft 500 is unlandable at the target area in cases in which the detector 240 identifies, from a non-illustrated alarm device installed at the target area or near the target area, that an alarm sound informing of the approach of an aircraft including the transport aircraft 400 and the delivery aircraft 500 is output at a sound pressure less than or equal to a predetermined sound pressure or not output at all.

The non-illustrated alarm device includes a CPU, a RAM, a ROM, a flash memory, a data communication circuit, and a speaker that are non-illustrated and that have the same configurations and functions as the configurations and functions of the CPU 191, the RAM 192, the ROM 193a, the flash memory 193b, the data communication circuit 194a, and the speaker 199a of the mobile terminal 190 illustrated in FIG. 3.

The acquirer 210 of the control device 200 acquires, in step S31 of FIG. 13, the arrival report notifying of the arrival of the transport aircraft 400 at the target area and, then, the notifier 260 of the control device 200 outputs, to the data communication circuit 204a illustrated in FIG. 4 with the alarm device as the destination, an alarm output command commanding the output of the alarm sound. Additionally, the aircraft controller 220 of the control device 200 outputs, to the data communication circuit 204a illustrated in FIG. 4 with the transport aircraft 400 as the destination, a sound transmission command commanding the transmission of sound information expressing the ambient sound around the transport aircraft 400.

When the data communication circuit of the non-illustrated alarm device receives the alarm output command from the control device 200, the CPU of the alarm device reads, in accordance with the alarm output command, data expressing the alarm sound stored in advance in the flash memory 193*b* and outputs, in accordance with the read data, a signal expressing the alarm sound to the speaker.

The transport aircraft 400 further includes a non-illustrated microphone that has the same configuration and functions as the configuration and functions of the microphone 199*b* of the mobile terminal 190 illustrated in FIG. 3. When the first data communication circuit 414*a* of the transport aircraft 400 receives the sound transmission command from the control device 200, the CPU 411 of the transport aircraft 400 generates, in accordance with a signal output by the non-illustrated microphone, sound information expressing the ambient sound including the alarm sound output from the speaker of the alarm device, and outputs the generated sound information to the first data communication circuit 414*a* with the control device 200 as the destination.

When the data communication circuit 204*a* of the control device 200 receives the sound information, the acquirer 210 of the control device 200 acquires the sound information from the data communication circuit 204*a*. Next, when the determiner 240 of the control device 200 determines that the sound pressure expressed in the acquired sound information is less than or equal to a predetermined sound pressure, the determiner 240 determines that the delivery aircraft 500 is unlandable at the target area (step S42) without executing steps S32 to S37. In contrast, when the determiner 240 of the control device 200 determines that the sound pressure expressed in the sound information is greater than the predetermined sound pressure, the determiner 240 continues the execution of the use determination processing illustrated in FIG. 13, in order from step S32.

The non-illustrated microphone is not limited to being provided to the transport aircraft 400, and the non-illustrated microphone may be provided to the ground vehicle 300. In this case, when the first data communication circuit 414*a* of the transport aircraft 400 receives the sound transmission command from the control device 200, the CPU 411 of the transport aircraft 400 may output the sound transmission command to the second data communication circuit 414*b* to forward the sound transmission command to the ground vehicle 300. Next, when the data communication circuit 384*b* of the ground vehicle 300 receives the sound transmission command, the CPU 381 of the ground vehicle 300 may generate sound information in accordance with the signal output by the non-illustrated microphone, and output the generated sound information to the data communication circuit 384*b*. Thereafter, when the first data communication circuit 414*a* of the transport aircraft 400 receives the sound transmission command, the CPU 411 of the transport aircraft 400 may output the sound transmission command to the first data communication circuit 414*a* with the control device 200 as the destination to forward the sound transmission command.

However, the present embodiment is not limited thereto, and a configuration is possible in which, in a case in which a moving body such as a person, an animal, or an object is present at the target area, the determiner 240 of the control device 200 also determines that the delivery aircraft 500 is unlandable at the target area in cases in which the detector 240 identifies, from the non-illustrated alarm device, that an alarm sound prompting exiting the target area is output at a sound pressure less than or equal to a predetermined sound pressure or not output at all.

The determiner 240 of the control device 200 outputs, in step S34 of FIG. 13, the travel command that causes the ground vehicle 300 to travel the target area and, then, the aircraft controller 220 of the control device 200 outputs the sound transmission command to the data communication circuit 204*a* illustrated in FIG. 4 with the transport aircraft 400 as the destination.

The non-illustrated alarm device is connected to a non-illustrated human detecting sensor that senses the presence of moving bodies in the target area. In one example, the non-illustrated motion sensor is implemented as a Doppler sensor. The non-illustrated motion sensor senses the ground vehicle 300 that moves within the target area, and outputs signals expressing that a moving body is sensed within the target area.

The non-illustrated alarm device includes an input port that is connected to the motion sensor. When the signal expressing that a moving body is sensed is input from the motion sensor via the input port of the non-illustrated alarm device, the CPU of the alarm device outputs, to the speaker, a signal expressing an alarm sound prompting exiting the target area.

When the first data communication circuit 414*a* of the transport aircraft 400 receives the sound transmission command, the CPU 411 generates sound information in accordance with a signal output by the non-illustrated microphone, and outputs the generated sound information to the first data communication circuit 414*a* with the control device 200 as the destination. Note that the transport aircraft 400 may forward, to the control device 200, sound information that the ground vehicle 300 provided with the non-illustrated microphone generates in accordance with the signal output by the microphone.

When the data communication circuit 204*a* of the control device 200 receives the sound information, the acquirer 210 of the control device 200 acquires the sound information from the data communication circuit 204*a*. When the determiner 240 of the control device 200 determines that the sound pressure expressed in the acquired sound information is less than or equal to a predetermined sound pressure, the determiner 240 determines that the delivery aircraft 500 is unlandable at the target area (step S42) without executing steps S35 to S37. In contrast, when the determiner 240 of the control device 200 determines that the sound pressure expressed in the sound information is greater than the predetermined sound pressure, the determiner 240 continues the execution of the use determination processing illustrated in FIG. 13, in order from step S35. Note that a person skilled in the art can determine, by experiment, the optimal value for the predetermined sound pressure.

The non-illustrated alarm device is not limited to including the motion sensor, and the alarm device may include a plurality of non-illustrated laser sensors. In one example, in a case in which the shape of the target area is rectangular, a first laser sensor to a fourth laser sensor are disposed clockwise or counter-clockwise at the vertices of the target area. Note that, the shape of the target area may be a shape other than rectangular, such as polygonal, circular, or elliptical.

The first laser sensor includes a non-illustrated light emitter that is a laser diode for example, and emits two lasers in space toward the second laser sensor that travel parallel or substantially parallel to each other, and a drive circuit that drives the light emitter. Additionally, the first laser sensor includes two non-illustrated light receivers that are photodiodes for example, respectively receive the two lasers that are emitted from the fourth laser sensor and that travel parallel or substantially parallel to each other, and output electronic signals. Furthermore, the first laser sensor includes a sensing circuit that senses, on the basis of the electronic signals output from each of the two light receivers, entering into or exiting from the target area of objects including people, animals, and things, and outputs, to the non-illustrated alarm device, a sensing signal expressing that an entering or exiting is sensed.

Of the two non-illustrated light receivers, when a second light receiver disposed more inward in the target area stops outputting the electronic signal within a predetermined amount of time from when a first light receiver disposed more outward in the target area stops outputting the electronic signal, the sensing circuit senses the entry of an object into the target area and outputs an entry signal expressing that an entry is sensed. Additionally, when the outer first light receiver stops outputting the electronic signal within a predetermined amount of time from when the inner second light receiver stops outputting the electronic signal, the sensing circuit senses the exit of an object from the target area and outputs an exit signal expressing that an exit is sensed.

With the exception that the first laser sensor emits lasers in space toward the second laser sensor and receives the lasers emitted into space by the fourth sensor, and the second laser sensor emits lasers in space toward the third laser sensor and receives the lasers emitted by the first sensor, the configuration and functions of the second laser sensor are the same as the configuration and functions of the first laser sensor. Additionally, with the exception that the third laser sensor emits lasers in space toward the fourth laser sensor and receives the lasers emitted by the second sensor, the configuration and functions of the third laser sensor are the same as the configuration and functions of the first laser sensor. Furthermore, with the exception that the fourth laser sensor emits lasers in space toward the first laser sensor and receives the lasers emitted by the third sensor, the configuration and functions of the fourth laser sensor are the same as the configuration and functions of the first laser sensor.

When an entry signal is inputted by any of the non-illustrated first to fourth laser sensors, the CPU of the non-illustrated alarm device increases, by a value of "1", a counter expressing the number of objects that have entered the target area but have not exited. In contrast, when an exit signal is inputted by any of the non-illustrated first to fourth laser sensors, the CPU reduces the counter by a value of "1". When the value of the counter is greater than the value "0", the CPU of the alarm device senses that an object is present in the target area, and outputs, to the speaker, a signal expressing an alarm sound prompting exiting the target area. In contrast, when the value of the counter is equal to the value "0", the CPU of the alarm device senses that there are no objects in the target area, and stops outputting the alarm sound.

Modified Example 11 of Embodiment

It is described that the delivery system 1 according to the present embodiment includes the control device 200 such as illustrated in FIG. 1, and the transport aircraft 400. However, the delivery system 1 is not limited thereto. A configuration is possible in which the delivery system 1 does not include the control device 200, and the control device 410 of the transport aircraft 400 illustrated in FIG. 10 demonstrates the functions of the control device 200 according to the present embodiment.

That is, the CPU 411 of the control device 410 of the transport aircraft 400 may execute the transport control processing illustrated in FIG. 5, the use determination processing illustrated in FIG. 13, the suitability determination processing illustrated in FIG. 14, and the delivery control processing illustrated in FIG. 17. Due to this configuration, the CPU 411 of the transport aircraft 400 may function as a non-illustrated acquirer, aircraft controller, ground vehicle controller, determiner, updater, and notifier that respectively have the same functions as the acquirer 210, the aircraft controller 220, the ground vehicle controller 230, the determiner 240, the updater 250, and the notifier 260 of the control device 200 illustrated in FIG. 6. Moreover, the flash memory 413b of the control device 410 of the transport aircraft 400 may function as a non-illustrated information storage that has the same functions as the information storage 290 of the control device 200 illustrated in FIG. 6.

The present embodiment and Modified Examples 1 to 11 of the present embodiment can be combined with each other. It is possible to provide the control device 200 that includes the configuration for realizing the functions according to any of the present embodiment and Modified Examples 1 to 10 of the present embodiment, and control device 410 that includes the configuration for realizing the functions according to Modified Example 11 of the present embodiment. In addition, it is possible to provide a system that includes a plurality of devices and that includes, as an overall system, configurations for realizing the functions according to any of the present embodiment and Modified Examples 1 to 11 of the present embodiment.

Additionally, by applying a program, existing control devices can each be made to function as the control device 200 according to each of the present embodiment and Modified Examples 1 to 10 of the present embodiment. That is, by applying a program for realizing the various functional configurations of the control device 200, described in each of the present embodiment and Modified Examples 1 to 10 of the present embodiment, so as to be executable by a computer (CPU or the like) that controls existing control devices, each of the existing control devices can be caused to each function as the control device 200 according any of the present embodiment and Modified Examples 1 to 10 of the present embodiment.

Additionally, by applying a program, an existing control device can be made to function as the control device 410 according to Modified Example 11 of present embodiment. That is, by applying a program for realizing the various functional configurations of the control device 410 described in Modified Example 11 of present embodiment so as to be executable by a computer (CPU or the like) that controls an existing control device, that existing control device can be caused to function as the control device 410 according to Modified Example 11 of the present embodiment.

Any distribution method of such a program can be used. For example, the program can be stored and distributed on a recording medium such as a memory card, a compact disc read-only memory (CD-ROM), or a digital versatile disk read-only memory (DVD-ROM), or can be distributed via a communication medium such as the internet. Additionally, the method according to the present disclosure can be implemented using the control device 200 according to any of the present embodiment and Modified Examples 1 to 10 of the present embodiment, and the control device 410 according to Modified Example 11 of present embodiment.

Preferred embodiments of the present disclosure have been described, but the present disclosure should not be construed as being limited to these specific embodiments. Various modifications and changes may be made within the broader spirit and scope of the invention as set forth in the claims.

Appendices

Appendix 1

A control device, including:
a ground vehicle controller that causes a ground vehicle to travel at a target area;
an acquirer that acquires state information expressing a state of a surface of the target area while the ground vehicle travels the target area; and
a determiner that determines, based on the acquired state information, whether or not an aircraft is landable at the target area.

Appendix 2

The control device according to appendix 1, wherein
the surface of the target area is covered by a covering,
the acquirer acquires, as the state information, information expressing an image obtained by imaging, by an imaging device that images the covering covering the surface, while the ground vehicle travels on the covering, and
the determiner determines, based on a change of the covering identified based on the acquired state information, whether or not the aircraft is landable at the target area covered by the covering.

Appendix 3

The control device according to appendix 2, wherein
the covering includes a predetermined pattern, and
the determiner determines, based on a change of the pattern of the covering identified based on the acquired state information, whether or not the aircraft is landable at the target area covered by the covering.

Appendix 4

The control device according to appendix 3, wherein
the determiner
identifies, based on the change of the pattern of the covering, a characteristic of the surface of the target area covered by the covering, and
identifies, based on the identified characteristic of the surface, whether or not the aircraft is landable at the target area.

Appendix 5

The control device according to appendix 4, wherein the characteristic of the surface includes any one or more of a size of an unevenness of the surface, a size of an incline of the surface, and a softness of the surface.

Appendix 6

The control device according to appendix 1, further including:
an aircraft controller that causes a transport aircraft that is physically connected to the ground vehicle and that transports the ground vehicle to lower the ground vehicle to the target area while the transport aircraft is flying above the target area, the transport aircraft being an aircraft that is identical to the aircraft or different from the aircraft, wherein
after the ground vehicle is lowered to the target area, the ground vehicle controller causes the ground vehicle to travel the target area while the transport aircraft is flying, and
after the ground vehicle travels the target area, the aircraft controller causes the transport aircraft to lift the ground vehicle from the target area while the transport aircraft is flying.

Appendix 7

The control device according to any one of appendices 2 to 5, further including:
an aircraft controller that causes a transport aircraft that is physically connected to the ground vehicle and that transports the ground vehicle to lower the ground vehicle to the target area while the transport aircraft is flying above the target area, the transport aircraft being an aircraft that is identical to the aircraft or different from the aircraft, wherein
after the ground vehicle is lowered to the target area, the ground vehicle controller causes the ground vehicle to travel the target area while the transport aircraft is flying, and
after the ground vehicle travels the target area, the aircraft controller causes the transport aircraft to lift the ground vehicle from the target area while the transport aircraft is flying.

Appendix 8

The control device according to appendix 7, wherein
the transport aircraft includes the imaging device that images the covering, and
the acquirer acquires, from the transport aircraft that transports the ground vehicle, the information expressing the image obtained by imaging while the ground vehicle travels on the covering, as the state information.

Appendix 9

The control device according to any one of appendices 1 to 8, wherein
the ground vehicle includes a detector that detects an attitude of the ground vehicle while the ground vehicle travels the target area,
the acquirer acquires, as the state information, information expressing the detected attitude of the ground vehicle, and
the determiner determines, based on the attitude of the ground vehicle expressed in the acquired state information, whether or not the aircraft is landable at the target area.

Appendix 10

The control device according to any one of appendices 1 to 9, wherein the determiner determines, based on the acquired state information, whether or not the aircraft is capable of taking off from the target area.

Appendix 11

A system, including:
a ground vehicle that travels a target area; and
a control device that includes
an acquirer that acquires state information expressing a state of a surface of the target area while the ground vehicle travels the target area, and
a determiner that determines, based on the acquired state information, whether or not an aircraft is landable at the target area.

Appendix 12

A method, including:
causing a ground vehicle to travel at a target area;
acquiring state information expressing a state of a surface of the target area while the ground vehicle travels the target area; and
determining, based on the acquired state information, whether or not an aircraft is landable at the target area.

REFERENCE SIGNS LIST

1 Delivery system
110 Covering
190 Mobile terminal
191, 201, 381, 411 CPU
192, 202, 382, 412 RAM
193a, 203a, 383a, 413a ROM
193b, 383b, 413b Flash memory
194a, 204a, 384b Data communication circuit
194b Voice communication circuit
195A, 205a Video card
195b, 205b Display device
195c, 205c Input device
196, 416 GPS circuit
199a Speaker
199b Microphone
200, 380, 410, 510 Control device
203b Hard disk
210 Acquirer
220 Aircraft controller
230 Ground vehicle controller
240 Determiner
250 Updater
260 Notifier
290 Information storage
300 Ground vehicle
301, 302 Wheel
310 Vehicle body
320, 451, 452, 551 Imaging device
387 Detector
388, 418 Input/output port
389, 419 Drive circuit
390 Fixing fixture
400 Transport aircraft
405 Winch
405a Drum
405b Support member
414a First data communication circuit
414b Second data communication circuit
421 to 424, 521 to 524 Propeller arm
431 to 434, 531 to 534 Propeller
443, 543 Support leg
500 Delivery aircraft
541a First holding frame
541b Second holding frame
542a, 542b Guide rail
H Altitude
IN Internet
p1 to p12 Point
pf1, pf2, ps1, ps2 Pattern
sf Reference first side
sf' Side opposite reference first side
ss Reference second side
ss' Side opposite reference second side
vm Reference vertex
W Wire

The invention claimed is:

1. A control device, comprising:
at least one memory storing computer program code; and
at least one processor operable to read the computer program code and operate as instructed by the computer program code, wherein
the computer program code includes:
aircraft control code configured to cause the at least one processor to perform control to cause a transport aircraft to lower a ground vehicle to a target area while the transport aircraft is flying above the target area, the transport aircraft being configured to be physically connected to the ground vehicle and being configured to transport the ground vehicle;
ground vehicle control code configured to cause the at least one processor to perform, after the ground vehicle is lowered to the target area, control to cause the ground vehicle to travel the target area while the transport aircraft is flying; and
acquiring code configured to cause the at least one processor to acquire state information expressing a state of a surface of the target area, the state being a state of the surface when the ground vehicle travels the target area,
wherein the aircraft control code is configured to cause the at least one processor to further perform, after the ground vehicle travels the target area, control to cause the transport aircraft to lift the ground vehicle from the target area while the transport aircraft is flying, and
wherein the computer program code further includes determination code configured to cause the at least one processor to determine, based on the acquired state information, whether or not an aircraft is landable at the target area, the aircraft being identical to the transport aircraft or being different from the transport aircraft.

2. The control device according to claim 1, wherein
the surface of the target area is covered by a covering,
the acquiring code is configured to cause the at least one processor to acquire, as the state information, information expressing an image obtained by imaging, by an imaging device configured to image the covering covering the surface, while the ground vehicle travels on the covering, and
the determination code is configured to cause the at least one processor to determine, based on a change of the covering identified based on the acquired state information, whether or not the aircraft is landable at the target area covered by the covering.

3. The control device according to claim 2, wherein
the covering includes a predetermined pattern, and
the determination code is configured to cause the at least one processor to determine, based on a change of the pattern of the covering identified based on the acquired state information, whether or not the aircraft is landable at the target area covered by the covering.

4. The control device according to claim 3, wherein
the ground vehicle includes a detector that is configured to detect an attitude of the ground vehicle while the ground vehicle travels the target area,
the acquiring code is configured to cause the at least one processor to acquire, as the state information, information expressing the detected attitude of the ground vehicle, and
the determination code is configured to cause the at least one processor to determine, based on the attitude of the ground vehicle expressed in the acquired state information, whether or not the aircraft is landable at the target area.

5. The control device according to claim 3, wherein
the determination code is configured to cause the at least one processor to
identify, based on the change of the pattern of the covering, a characteristic of the surface of the target area covered by the covering, and
determine, based on the identified characteristic of the surface, whether or not the aircraft is landable at the target area.

6. The control device according to claim 5, wherein
the ground vehicle includes a detector that is configured to detect an attitude of the ground vehicle while the ground vehicle travels the target area,
the acquiring code is configured to cause the at least one processor to acquire, as the state information, information expressing the detected attitude of the ground vehicle, and
the determination code is configured to cause the at least one processor to determine, based on the attitude of the ground vehicle expressed in the acquired state information, whether or not the aircraft is landable at the target area.

7. The control device according to claim 5, wherein the characteristic of the surface includes any one or more of a size of an unevenness of the surface, a size of an incline of the surface, and a softness of the surface.

8. The control device according to claim 7, wherein
the ground vehicle includes a detector that is configured to detect an attitude of the ground vehicle while the ground vehicle travels the target area,
the acquiring code is configured to cause the at least one processor to acquire, as the state information, information expressing the detected attitude of the ground vehicle, and
the determination code is configured to cause the at least one processor to determine, based on the attitude of the ground vehicle expressed in the acquired state information, whether or not the aircraft is landable at the target area.

9. The control device according to claim 2, wherein
the transport aircraft includes the imaging device configured to image the covering, and
the acquiring code is configured to cause the at least one processor to acquire, from the transport aircraft that is configured to transport the ground vehicle, the information expressing the image obtained by imaging while the ground vehicle travels on the covering, as the state information.

10. The control device according to claim 2, wherein
the ground vehicle includes a detector that is configured to detect an attitude of the ground vehicle while the ground vehicle travels the target area,
the acquiring code is configured to cause the at least one processor to acquire, as the state information, information expressing the detected attitude of the ground vehicle, and
the determination code is configured to cause the at least one processor to determine, based on the attitude of the ground vehicle expressed in the acquired state information, whether or not the aircraft is landable at the target area.

11. The control device according to claim 1, wherein
the ground vehicle includes a detector that is configured to detect an attitude of the ground vehicle while the ground vehicle travels the target area,
the acquiring code is configured to cause the at least one processor to acquire, as the state information, information expressing the detected attitude of the ground vehicle, and
the determination code is configured to cause the at least one processor to determine, based on the attitude of the ground vehicle expressed in the acquired state information, whether or not the aircraft is landable at the target area.

12. The control device according to claim 1, wherein the determination code is configured to cause the at least one processor to determine, based on the acquired state information, whether or not the aircraft is capable of taking off from the target area.

13. A system, comprising:
a ground vehicle configured to travel a target area; and
a control device that includes
at least one memory storing computer program code, and
at least one processor operable to read the computer program code and operate as instructed by the computer program code, wherein
the computer program code includes:
aircraft control code configured to cause the at least one processor to perform control to cause a transport aircraft to lower the ground vehicle to the target area while the transport aircraft is flying above the target area, the transport aircraft being configured to be physically connected to the ground vehicle and being configured to transport the ground vehicle;
ground vehicle control code configured to cause the at least one processor to perform, after the ground vehicle is lowered to the target area, control to cause the ground vehicle to travel the target area while the transport aircraft is flying; and
acquiring code configured to cause the at least one processor to acquire state information expressing a state of a surface of the target area, the state being a state of the surface when the ground vehicle travels the target area,
wherein the aircraft control code is configured to cause the at least one processor to further perform, after the ground vehicle travels the target area, control to cause the transport aircraft to lift the ground vehicle from the target area while the transport aircraft is flying, and
wherein the computer program code further includes determination code configured to cause the at least one processor to determine, based on the acquired state information, whether or not an aircraft is landable at the target area, the aircraft being identical to the transport aircraft or being different from the transport aircraft.

* * * * *